United States Patent
Benoit et al.

(10) Patent No.: US 10,139,627 B2
(45) Date of Patent: Nov. 27, 2018

(54) HEAD-MOUNTED DISPLAY SYSTEM AND COMPONENTS

(71) Applicant: 3M INNOVATIVE PROPERTIES COMPANY, St. Paul, MN (US)

(72) Inventors: Gilles Jean-Baptiste Benoit, Minneapolis, MN (US); Andrew J. Ouderkirk, St. Paul, MN (US); Erin A. McDowell, Afton, MN (US); Brian K. Riddle, West Lakeland, MN (US); Kenneth Andrew Penner Meyer, White Bear Township, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/328,994

(22) PCT Filed: Aug. 11, 2015

(86) PCT No.: PCT/US2015/044594
§ 371 (c)(1),
(2) Date: Jan. 25, 2017

(87) PCT Pub. No.: WO2016/025443
PCT Pub. Date: Feb. 18, 2016

(65) Prior Publication Data
US 2017/0219825 A1    Aug. 3, 2017

Related U.S. Application Data

(60) Provisional application No. 62/036,972, filed on Aug. 13, 2014.

(51) Int. Cl.
G02B 27/01    (2006.01)
G02C 7/04    (2006.01)
(Continued)

(52) U.S. Cl.
CPC ......... G02B 27/0172 (2013.01); G02B 5/305 (2013.01); G02B 5/3083 (2013.01);
(Continued)

(58) Field of Classification Search
CPC .. G02B 27/0172; G02B 27/017; G02B 5/305; G02B 5/3025; G02B 5/30; G02B 5/3083;
(Continued)

(56) References Cited

U.S. PATENT DOCUMENTS 2,870,030 A    1/1959    Stradley
4,909,896 A    3/1990    Ikushima
(Continued)

FOREIGN PATENT DOCUMENTS

JP    2010-044326    2/2010
WO    WO 90-08339    7/1990
(Continued)

OTHER PUBLICATIONS

"AbleData: Vision Aids for People with Impaired Color Perception," [retrieved from the internet on Mar. 27, 2017], URL <https://web.archive.org/web/20140605074029/http://www.abledata.com/abledata_docs/Color_Blind.htm>, 6 pages.
(Continued)

*Primary Examiner* — William R Alexander
(74) *Attorney, Agent, or Firm* — Clifton F. Richardson

(57) ABSTRACT

A head-mounted display system including a contact lens having a first region and a second region adjacent the first region, an eyewear lens having an inner surface facing the contact lens, and an illuminator configured to produce an imaged light output directed toward the inner surface of the eyewear lens. A first imaged light ray produced by the illuminator is incident on the inner surface and is reflected by the eyewear lens to the first region. The first region is configured to transmit the first imaged light ray, and the
(Continued)

second region is configured to reflect or absorb a second imaged light ray produced by the illuminator and reflected from the eyewear lens. The eyewear lens is configured to transmit an ambient light ray to the second region and the second region is configured to transmit the ambient light ray.

19 Claims, 15 Drawing Sheets

(51) Int. Cl.
    *G02B 5/30*     (2006.01)
    *G02C 7/10*     (2006.01)
    *G02C 7/12*     (2006.01)
    *G02C 11/00*     (2006.01)

(52) U.S. Cl.
    CPC .............. *G02B 27/01* (2013.01); *G02C 7/04* (2013.01); *G02C 7/105* (2013.01); *G02C 7/12* (2013.01); *G02C 11/10* (2013.01); *G02B 2027/0178* (2013.01); *G02C 2202/16* (2013.01); *G02C 2202/20* (2013.01)

(58) Field of Classification Search
    CPC .. G02B 2027/0178; G02C 7/04; G02C 7/105; G02C 7/12; G02C 11/10; G02C 2202/16; G02C 2202/20
    USPC ............................................. 351/159.44, 158
    See application file for complete search history.

(56) References Cited

U.S. PATENT DOCUMENTS

| | | | |
|---|---|---|---|
| 5,061,057 A | | 10/1991 | Kumakura |
| 5,104,213 A | * | 4/1992 | Wolfson ........... B29D 11/00932 219/121.7 |
| 5,712,721 A | * | 1/1998 | Large ................... A61F 2/1613 351/158 |
| 5,825,543 A | | 10/1998 | Ouderkirk |
| 5,867,316 A | | 2/1999 | Carlson |
| 5,882,774 A | | 3/1999 | Jonza |
| 6,036,314 A | * | 3/2000 | Wolfson ................... G02C 7/04 351/159.02 |
| 6,111,697 A | * | 8/2000 | Merrill ................... G02B 5/305 359/487.02 |
| 6,113,811 A | * | 9/2000 | Kausch ...................... C08J 5/18 252/585 |
| 6,157,490 A | | 12/2000 | Wheatley |
| 6,384,982 B1 | | 5/2002 | Spitzer |
| 6,531,230 B1 | | 3/2003 | Weber |
| 6,774,961 B2 | | 8/2004 | Faris |
| 6,783,349 B2 | | 8/2004 | Neavin |
| 6,874,888 B1 | | 4/2005 | Dudai |
| 7,004,583 B2 | * | 2/2006 | Miniutti ................... G02C 7/02 351/159.56 |
| 7,758,187 B2 | | 7/2010 | Amirparviz |
| 8,142,016 B2 | | 3/2012 | Legerton |
| 8,441,731 B2 | | 5/2013 | Sprague |
| 8,482,858 B2 | | 7/2013 | Sprague |
| 8,520,309 B2 | | 8/2013 | Sprague |
| 8,873,019 B2 | * | 10/2014 | Yu ......................... G02B 3/0031 349/15 |
| 9,804,669 B2 | * | 10/2017 | Fateh ....................... G06F 3/011 |
| 10,007,333 B2 | * | 6/2018 | Fateh ....................... G06F 3/011 |
| 2004/0135742 A1 | * | 7/2004 | Weber ..................... G02B 5/305 345/7 |
| 2004/0233524 A1 | * | 11/2004 | Lippey ................. G02B 5/0816 359/443 |
| 2006/0221453 A1 | * | 10/2006 | Koehler ............... G02B 5/3083 359/619 |
| 2006/0262400 A1 | | 11/2006 | Ouderkirk |
| 2007/0177275 A1 | * | 8/2007 | McGuire, Jr. .......... G02B 17/08 359/630 |
| 2007/0298242 A1 | | 12/2007 | Huo |
| 2008/0187749 A1 | | 8/2008 | Cael |
| 2010/0039796 A1 | | 2/2010 | Mukawa |
| 2010/0053030 A1 | | 3/2010 | Sprague |
| 2010/0053549 A1 | | 3/2010 | Legerton et al. |
| 2010/0134719 A1 | | 6/2010 | Johns |
| 2010/0149618 A1 | * | 6/2010 | Sprague ............. G02B 27/0172 359/259 |
| 2010/0328612 A1 | * | 12/2010 | Huber .................... G02B 7/008 353/8 |
| 2011/0096100 A1 | | 4/2011 | Sprague |
| 2011/0255163 A1 | | 10/2011 | Merrill |
| 2012/0003380 A1 | | 1/2012 | Yu |
| 2012/0120365 A1 | | 5/2012 | Legerton et al. |
| 2013/0001830 A1 | | 1/2013 | Endle |
| 2013/0242392 A1 | * | 9/2013 | Amirparviz ........ G02B 27/0172 359/485.05 |
| 2013/0321758 A1 | * | 12/2013 | Collett ..................... G02C 7/12 351/49 |
| 2014/0125944 A1 | | 5/2014 | Huang |
| 2014/0128608 A1 | | 5/2014 | Radloff |
| 2015/0116658 A1 | * | 4/2015 | Trapani ..................... G02C 7/12 351/178 |
| 2015/0146166 A1 | | 5/2015 | Weber |
| 2016/0011417 A1 | * | 1/2016 | Border ............... G02B 27/0172 359/630 |

FOREIGN PATENT DOCUMENTS

| | | |
|---|---|---|
| WO | WO 96-19347 | 6/1996 |
| WO | WO 2012-161996 | 11/2012 |
| WO | WO 2013-101553 | 7/2013 |
| WO | WO 2014-022049 | 2/2014 |
| WO | WO 2014-110101 | 7/2014 |

OTHER PUBLICATIONS

Amimori, Optomechanical Properties of Stretched Polymer Dispersed Liquid Crystal Films for Scattering Polarizer Applications, Journal of Applied Physics, Mar. 2003, vol. 93 (3248), No. 6, pp. 22.
Apel, Track Etching Technique in Membrane Technology, Radiation Measurements, Jun. 2001, vol. 34, No. 1-6, pp. 559-566.
"Color View Products," [retrieved from the internet on Jul. 31, 2014], URL<http://color-view.com/products.php>, 5 pages.
"Dr. Azman's ColorCorrection™ System," Colormax [on line] [retrieved from the internet on Jul. 31, 2014], URL <http://www.colormax.org/color-correction-system.htm>, 1 page.
"Enhancing Patient's Lives, Increasing Comprehension, Improving Colors," ChromaGen Europe [on line] [retrieved from the internet on Jul. 31, 2014], URL <http://www.chromagen.us/>, 5 pages.
Hollowell, "Nanowire Grid Polarizers Integrated into Flexible, Gas Permeable, Biocompatible Materials and Contact Lenses," Advanced Optical Materials, Apr. 2013, vol. 1, No. 4, pp. 343-348.
Hsu, "Transparent Displays Enabled by Resonant Nanoparticle Scattering," Nature Communications 5, Article No. 3152, DOI: 10.1038/ncomms4152, Jan. 2014, pp. 6.
"Prevalence-Color Blindness," [retrieved from the internet on Mar. 26, 2017], URL <http://www.colour-blindness.com/general/prevalence/>, 3 pages.
Seiberle, "Photo-Aligned Anisotropic Optical Thin Films," Journal of the Society for Information Display, Mar. 2004, Vo.12, No. 1, pp. 87-92.
International Search Report for PCT International Application No. PCT/US2015/044594, dated Nov. 16, 2015, 8 pages.
Lira et al., The effect of lens wear on refractive indies of conventional hydrogel and silicone-hydrogel contact lenses: A comparative study, ScienceDirect, Contact Lens & Anterior Eye, vol. 31, Apr. 1, 2008, pp. 89-94, XP022613264.
Zeiss International, Plastic or Glass Lenses?, Jan. 1, 2012, pp. 1-2, XP002777927.

\* cited by examiner

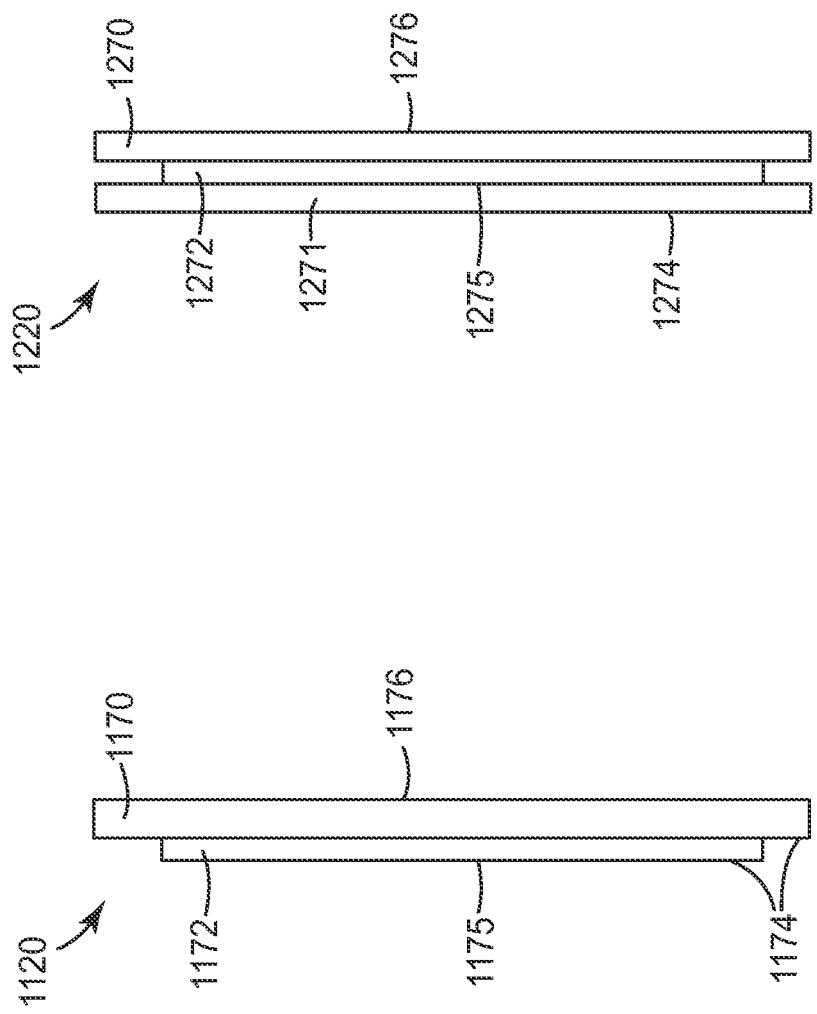

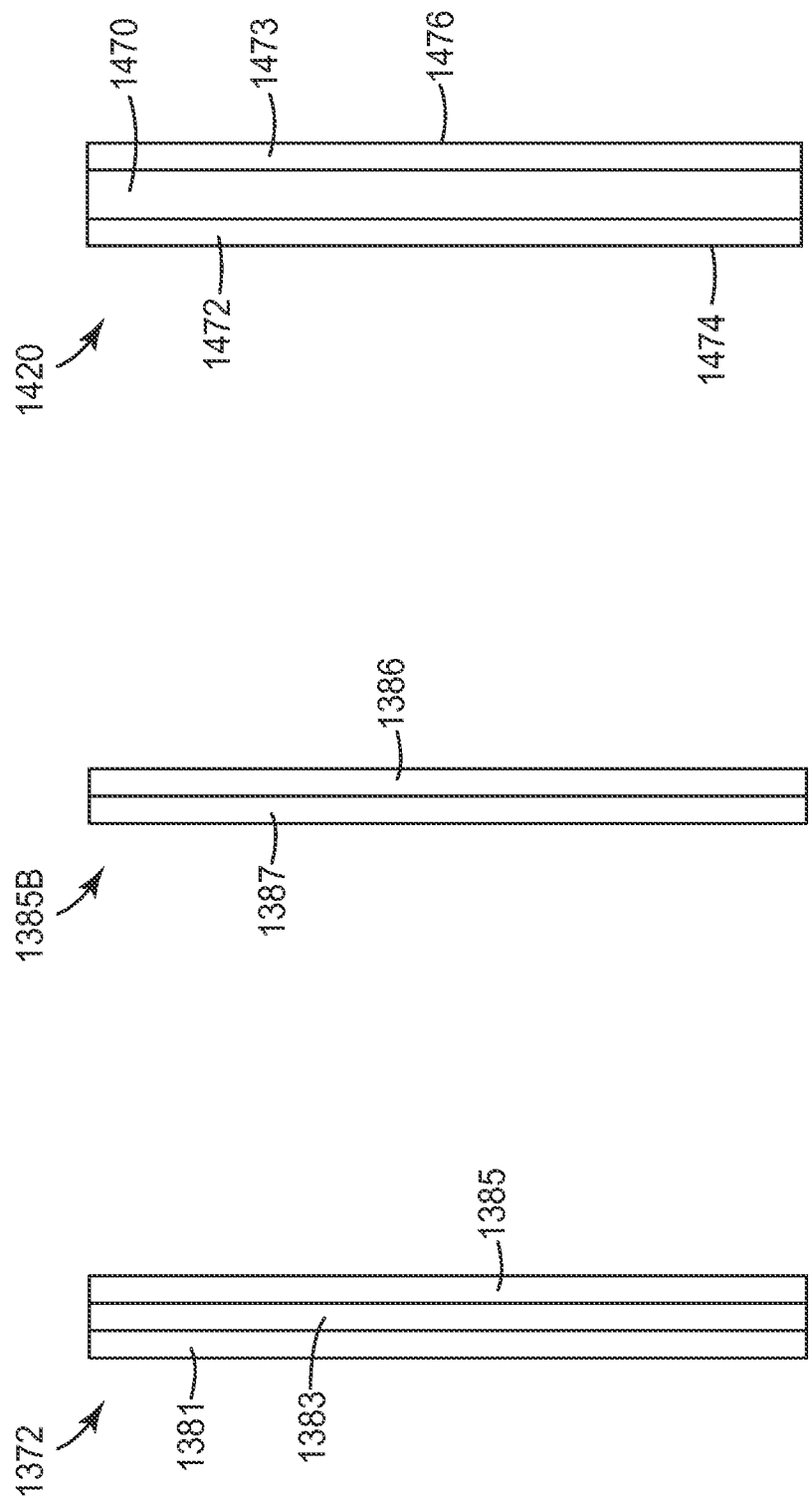

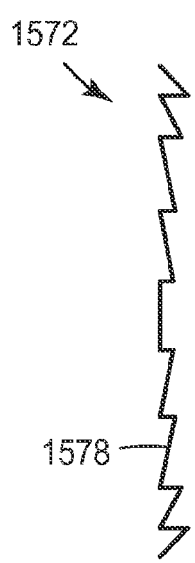
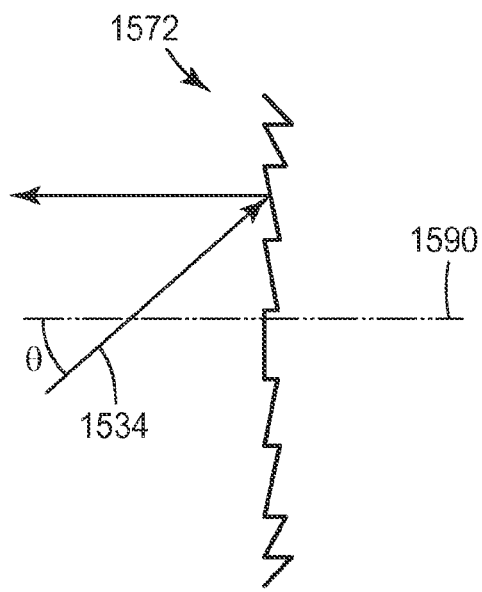
FIG. 15A    FIG. 15B
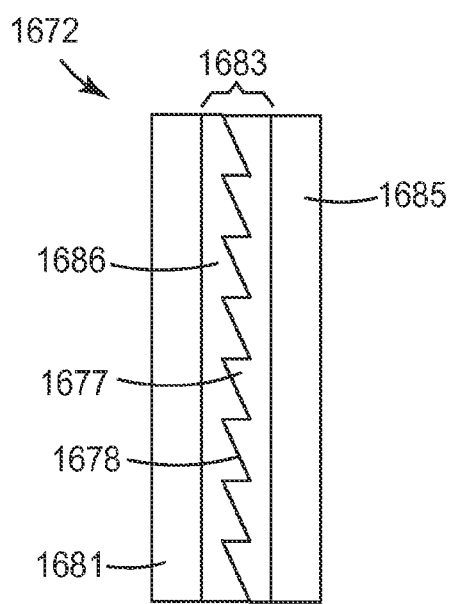
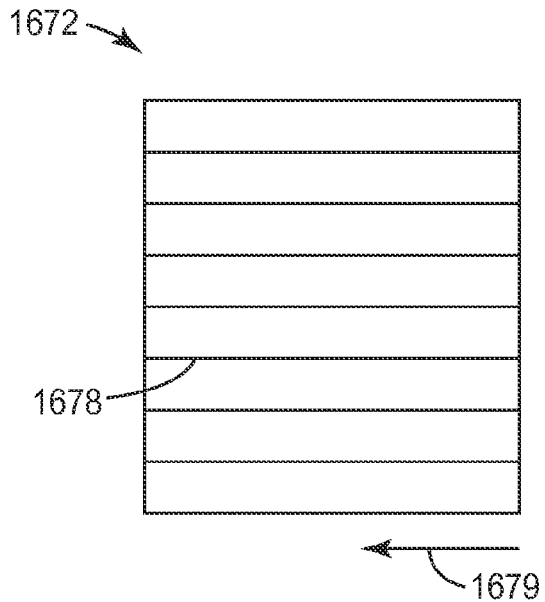
FIG. 16A    FIG. 16B

HEAD-MOUNTED DISPLAY SYSTEM AND COMPONENTS

BACKGROUND

A head-mounted display is a display worn on or about the head. Head-mounted displays may incorporate an optical system that displays an image to a viewer with the image superimposed over a real-world view. Conventional head-mounted displays have various drawbacks including the size and appearance of such systems required to provide a wide field of view and a comfortable eye to system distance for the viewer. Accordingly, an improved head-mounted display is desired.

SUMMARY

In some aspects of the present description, a display system is provided that includes a contact lens having a first region and a second region adjacent the first region, an eyewear lens having an inner surface facing the contact lens and having an outer surface opposite the inner surface, and an illuminator configured to produce an imaged light output directed toward the inner surface of the eyewear lens. The eyewear lens is disposed proximate the contact lens and proximate the illuminator such that a first imaged light ray produced by the illuminator is incident on the inner surface and is reflected by the eyewear lens to the first region. The first region is configured to transmit the first imaged light ray and the second region is configured to reflect or absorb a second imaged light ray produced by the illuminator and reflected from the eyewear lens. The eyewear lens is configured to transmit an ambient light ray incident on the outer surface to the second region and the second region is configured to transmit the ambient light ray.

In some aspects of the present description, a contact lens is provided that includes a lens substrate incorporating a micro-perforated multilayer birefringent polymeric optical film.

In some aspects of the present description, a contact lens is provided that includes a lens substrate and that has a portion configured to direct a light incident on the portion of the contact lens into a pupil of a user. The portion includes a first region and a second region surrounding the first region. The first region incorporates one or more optical elements and the one or more optical elements do not extend into the second region. The one or more optical elements include glass having a refractive index greater than 1.8.

In some aspects of the present description, a contact lens is provided that includes a first region and a second region adjacent the first region. The first region is not simply connected and either the first region is bounded by the second region or the second region is bounded by the first region. The second region incorporates at least one optical film spanning the second region and not extending into the first region.

In some aspects of the present description, a contact lens is provided that includes a first region and a second region different from the first region. The first region incorporates a first multilayer birefringent polymeric optical film and the second region incorporates a second multilayer birefringent polymeric optical film different from the first multilayer birefringent polymeric optical film.

In some aspects of the present description, a contact lens is provided that includes a first region and a second region and that incorporates a multilayer optical film having a plurality of layers continuously extending through the first and second regions. In the first region, the plurality of layers provides a first reflective characteristic, and in the second region, the plurality of layers provides a second reflective characteristic different from the first reflective characteristic.

In some aspects of the present description, an eyewear lens is provided that includes a reflective polarizer. The eyewear lens has an inner surface configured to face a user and an outer surface opposite the inner surface. The reflective polarizer includes microstructures configured to reflect at least a portion of a light incident on the inner surface of the eyewear lens at an off-normal angle in a range of about 10 degrees to about 80 degrees into a direction substantially normal to the eyewear lens.

In some aspects of the present description, an eyewear lens is provided that includes a diffusely reflective circular polarizer. The eyewear lens has an inner major surface configured to face a user and an outer major surface opposite the inner major surface. The diffusely reflective circular polarizer diffusely reflects light having a first circular polarization incident on the inner major surface of the eyewear lens.

In some aspects of the present description, an eyewear lens is provided that includes a layer incorporating nanoparticles providing wavelength-selective reflection. The wavelength-selective reflection includes a first reflection band having a FWHM bandwidth less than about 150 nm.

In some aspects of the present description, a contact lens is provided that includes a notch reflective polarizer.

In some aspects of the present description, an eyewear lens is provided that includes a notch reflective polarizer.

In some aspects of the present description, an eyewear lens is provided that includes a layer incorporating a plurality of quantum dots configured to provide emission in a wavelength band.

BRIEF DESCRIPTION OF THE DRAWINGS

FIGS. 11-12 are cross-sectional views of eyewear lenses;

FIGS. 13A-13B are cross-sectional views of optical films that may be included in eyewear lenses;

FIG. 14 is a cross-sectional view of an eyewear lens;

FIG. 15A is a cross-sectional view of an optical film that may be included in an eyewear lens;

FIG. 15B is a schematic side view of light reflecting from an optical film;

FIG. 16A is a cross-sectional view of an optical film that may be included in an eyewear lens;

FIG. 16B is a schematic front view of the optical film of FIG. 16A;

DETAILED DESCRIPTION

In the following description, reference is made to the accompanying drawings that forms a part hereof and in which are shown by way of illustration. Descriptions for elements in figures should be understood to apply equally to corresponding elements in other figures, unless indicated otherwise. The figures are not necessarily to scale. It is to be understood that other embodiments are contemplated and may be made without departing from the scope or spirit of the present disclosure. The following detailed description, therefore, is not to be taken in a limiting sense.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

Conventional head-mounted displays have various drawbacks including the size and appearance of such systems required to provide a wide field of view and a comfortable eye to system distance for the viewer. Various improvements are provided by head-mounted displays that require the viewer to wear a contact lens. However, known systems of this type require a display panel to be placed directly in front of an eye of the viewer and this may interfere with a real-world view. According to the present description, it has been discovered that improved head-mounted displays can be made that include a contact lens and an eyewear lens (e.g., a lens configured to be mounted in an eyeglass frame), both including optical elements such as optical filters (e.g., polarizers and/or spectral filters), without having to position a display panel in front of a viewer's eye. In particular, in some aspects of the present description, it has been found that a projector can be disposed to project light off of an eyewear lens that includes an optical filter which reflects at least a portion of the projected light into a direction close to the normal of the eyewear lens and towards a viewer's eye. The eyewear lens transmits at least a portion of the ambient light towards the viewer's eye. A contact lens includes a first region which transmits imaged light reflected from the eyewear lens and a second region having an optical filter which transmits ambient light but blocks (i.e., reflects or absorbs) projected light reflected into the second region. The first region may be small compared to a pupil of an eye and may include a focusing element that focuses light from the projector onto a retina of the eye.

Figure 1A:
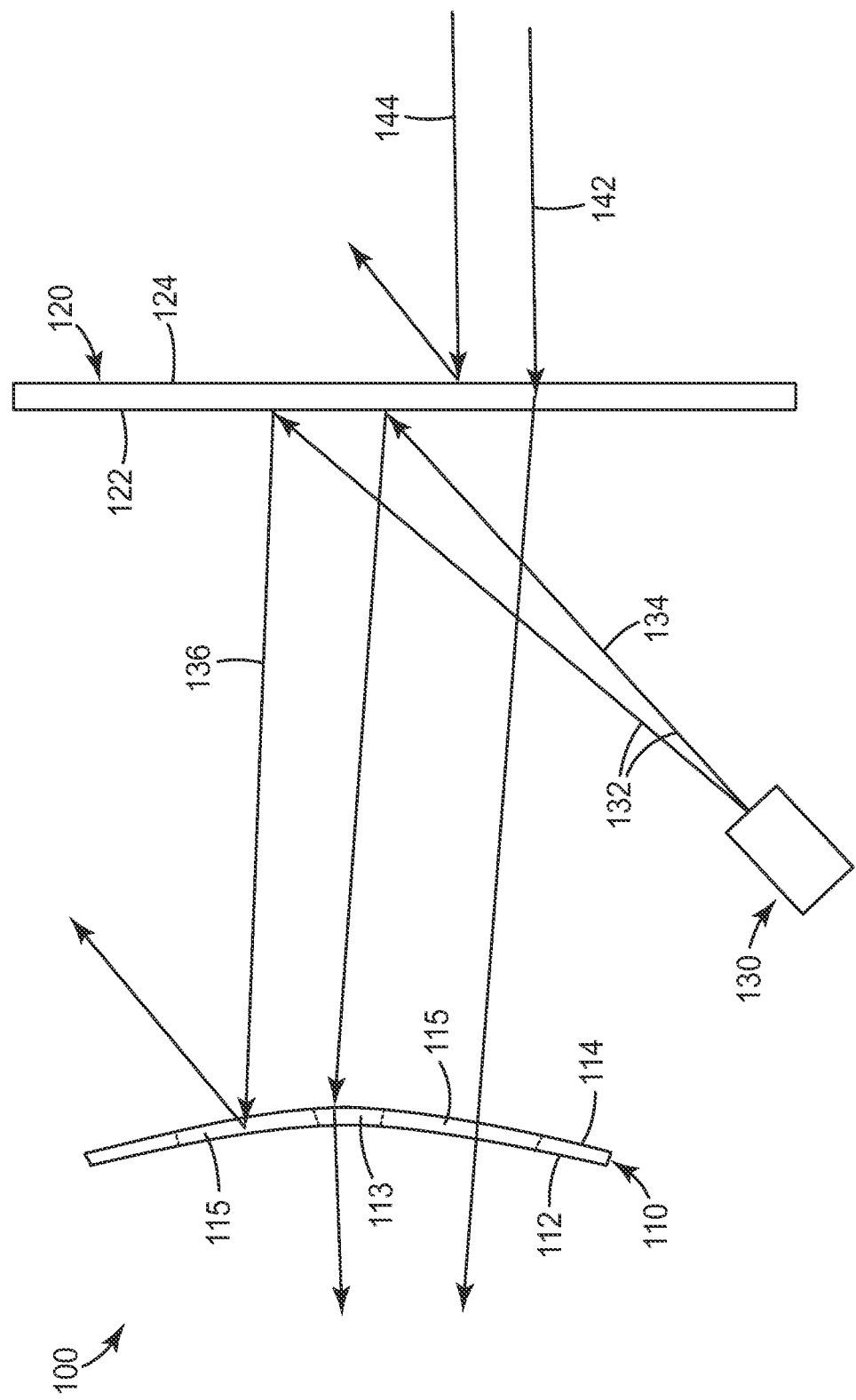
FIG. 1A is a schematic cross-sectional view of a display system.

FIG. 1A shows a schematic cross-sectional view of a display system 100 including a contact lens 110 having a first region 113 and a second region 115, an eyewear lens 120 having an inner surface 122 facing the contact lens 110 and having an outer surface 124 opposite the inner surface 122, and an illuminator 130 configured to produce an imaged light output 132 directed toward the inner surface 122 of the eyewear lens 120. The eyewear lens 120 is disposed proximate the contact lens 110 and proximate the illuminator 130 such that a first imaged light ray 134 produced by the illuminator 130 is incident on the inner surface 122 and is reflected by the eyewear lens 120 to the first region 113. The first region 113 is configured to transmit the first imaged light ray 134. The second region 115 is configured (e.g., by including an appropriate optical filter) to reflect or absorb a second imaged light ray 136 produced by the illuminator 130 and reflected from the eyewear lens 120. The eyewear lens 120 is configured to transmit a first ambient light ray 142 incident on the outer surface 124 to the second region 115. The second region 115 is configured to transmit the first ambient light ray 142. The eyewear lens 120 may reflect or absorb a second ambient light ray 144. Contact lens 110 has an inner major surface 112 configured to face an eye of a person wearing the contact lens 110 and an outer major surface 114 opposite inner major surface 112 and facing eyewear lens 120.

In FIG. 1A, eyewear lens 120 is schematically shown as a flat sheet. It should be understood that eyewear lens 120 may have a curvature as is the case for many conventional eyewear lenses. For example, eyewear lens 120 may be a prescription lens and may have a curvature associated with the prescription strength. Alternatively, contact lens 110 may be a prescription lens.

Illuminator 130 may be a projector that is mounted to an eyewear frame. In some embodiments, the illuminator 130 is configured to produce polarized light output having a first polarization and the eyewear lens 120 is configured to reflect the polarized light output substantially without changing the polarization state. First region 113 may include a polarizer that passes the first polarization and that reflects or absorbs a second polarization that is substantially orthogonal to the first polarization. Alternatively, first region 113 may be optically clear and may include a lens element that focuses imaged light onto the retina of a person wearing the contact lens. In some embodiments, first region 113 includes both a lens element and a polarizer. Second region 115 may include a polarizer that reflects or absorbs light having the first polarization. In some embodiments, the first polarization is a first linear polarization and the second polarization is a second linear polarization that may be orthogonal to the first linear polarization. In some embodiments, the first polarization is a first circular polarization and the second polarization is a second circular polarization. For example, the first polarization may be a right circular polarization and the second polarization may be a left circular polarization.

In some embodiments, the second region includes an optical filter configured to differentiate ambient light and imaged light based on polarization, spectrum or both. In some embodiments, illuminator 130 produces light having a spectral distribution peaked in the red, the green and the blue portions of the spectrum. Such a distribution can arise from using red, green and blue light emitting diodes (LEDs) with a liquid crystal on silicon (LCoS) display panel, for example. Such a distribution can also arise from using an organic light emitting diode (OLED) display as the illuminator 130. Second region 115 may include a notch filter (i.e., a spectrally selective filter that blocks light in narrow wavelength band(s)) that blocks light in the red, green and blue spectrum generated by illuminator 130 but passes light outside of these regions. In some embodiments, one, two, three or four (or more) LED or OLED colors are used and correspondingly the notch filter blocks one, two, three or four (or more) bands. The notch filter may block light in a wavelength band by absorbing the light, reflecting the light, or by a combination of absorption and reflection of the light.

In some embodiments, contact lens 110 and/or eyewear lens 120 includes a notch reflective polarizer, i.e., a spectrally selective reflective polarizer that reflects light having a first polarization in discrete spectral bands in the visible wavelength spectrum (e.g., wavelengths between about 400 nm and about 700 nm) and passes the remaining visible light. The notch reflective polarizer may include a multilayer birefringent polymeric film. In some embodiments, second region 115 includes a multilayer birefringent polymeric film which is a notch reflective polarizer. Similarly, in some embodiments, eyewear lens 120 includes a multilayer birefringent polymeric film which is a notch reflective polarizer. Using notch reflective polarizers allows a larger fraction of ambient light to reach the eye compared to using broad-band reflective polarizers. Suitable notch reflective polarizers can be made from alternating birefringent polymeric layers using the techniques described in U.S. Pat. No. 6,157,490 (Wheatley et al.), and U.S. Pat. No. 6,531,230 (Weber et al.). In some embodiments, a notch reflective polarizer included in an eyewear lens or included in a contact lens reflects a first polarization in one or more distinct bands whose full width at half maximum (FWHM) is no greater than about 60 nm, or no greater than about 50 nm, or no greater than about 35 nm, or no greater than about 20 nm. In some embodiments, each distinct band has a bandwidth greater than about 10 nm. Having reflection bandwidths in the rage of 10 nm to 60 nm, for example, is useful for reflecting light from LED(s) in an illuminator and for transmitting light outside of this range. Such a notch reflective polarizer allows imaged light from the illuminator to be blocked from entering second region 115 and/or to reflect from eyewear lens 120 while allowing ambient light to be transmitted through second region 115 and/or eyewear lens 120 with minimal loss. In some embodiments, the one or more bands include one, two, three or four non-overlapping bands each having a bandwidth no greater than 60 nm. In some embodiments, contact lens 110 includes a notch reflective polarizer in second region 115 and the notch reflective polarizer does not extend into first region 113.

Absorbing or partially absorbing polarizers may also be included to reduce or substantially eliminate glare from the contact lens or the eyewear lens. For example, eyewear lens 120 may include a reflective polarizer adjacent a substrate of the eyewear lens 120 and may include an absorbing polarizer adjacent the reflective polarizer and facing outer surface 124. Similarly, second region 115 of contact lens 110 may include a reflective polarizer and may include an absorbing polarizer adjacent the reflective polarizer and facing eyewear lens 120.

Any of the polarizers of the present description may be linear polarizers or may be circular polarizers which may be constructed from a quarter-wave layer and a linear polarizer. In some embodiments, one or both of the first region 113 and the second region 115 includes a polarizer. The polarizer may include a reflective polarizer and may include an absorbing polarizer (e.g., a dichroic polarizer) adjacent the reflective polarizer as described, for example, in U.S. Pat. App. Pub. No. 2006/0262400 (Ouderkirk et al.). The polarizer may be a reflective circular polarizer which may include a quarter-wave layer facing the eyewear lens 120 and a linear polarizer adjacent the quarter-wave layer opposite the eyewear lens 120. The polarizer may include a quarter-wave layer facing the eyewear lens 120, an absorbing polarizer adjacent the quarter-wave layer opposite the eyewear lens 120, and a linear reflective polarizer adjacent the absorbing polarizer opposite the quarter-wave layer. The quarter-wave layer may be oriented such that the fast axis of the quarter-wave layer is at an angle of approximately 45 degrees relative to a pass axis of the linear reflective polarizer so that the combination of the quarter-wave layer and the linear polarizer reflects light having a first circular polarization and transmits or absorbs light having a second circular polarization.

The quarter-wave layer may be a separate film disposed adjacent the reflective polarizer or may be a coating which may be applied to the reflective polarizer. Suitable coatings include linear photo-polymerization (LPP) materials from ROLIC Research Ltd. (Switzerland) as described in "Photo-aligned anisotropic optical thin films", Seiberle et al., Journal of the SID, 12/1 (2004). Once a coating is applied to a first film or layer, the coating may be described as a second film or layer. LPP materials allow a retarder to be formed that is patterned or spatially tailored. In some embodiments, contact lens 110 includes a layer formed from an LPP material that extends throughout the first and second regions 113 and 115 and that is spatially tailored to provide a first retardance in the first region 113 and a second retardance in the second region 115. For example, the LPP layer may provide a quarter-wavelength retardance with a fast axis along a first direction (for example, at an angle of about 45 degrees relative to a pass axis of a reflective polarizer) in the first region 113 and may provide a quarter-wavelength retardance with the fast axis rotated about 90 degrees relative to the first direction in the second region. Such a layer can be combined with a linear polarizer to make a contact lens having a right circular polarizer in the first region and a left circular polarizer in the second region, for example.

Suitable multilayer birefringent polymeric optical films for used in the contact lenses or eyewear lenses of the present description may be made by a continuous process that may involve coextrusion of alternating polymer materials and stretching the resulting multilayer polymer web, e.g. as described in U.S. Pat. No. 5,882,774 (Jonza et al.), U.S. Pat. No. 6,531,230 (Weber et al.), and U.S. Pat. No. 6,783,349 (Neavin et al.).

Suitable reflective polarizers also include cholesteric reflective polarizers and wire grid polarizers, which may be used in a contact lens or in an eyewear lens. When used in an eyewear lens, a wire grid polarizer may be designed to scatter light having a polarization that is reflected by the polarizer. Suitable wire grid polarizers are described in U.S. Pat. App. Pub. No. 2010/0134719 (Johns et al.). Wire-grid polarizers are suitable for use in a contact lens since wire-grid polarizers provide a high permeability to gases such as oxygen and carbon dioxide and may therefore provide a comfortable contact lens that preserves the health of the cornea.

In some embodiments, at least about 2 percent, or at least about 5 percent, or at least about 10 percent, and less than about 35 percent, or less than about 50 percent of the imaged light output 132 produced by the illuminator 130 is transmitted through the contact lens 110.

Figure 1B:
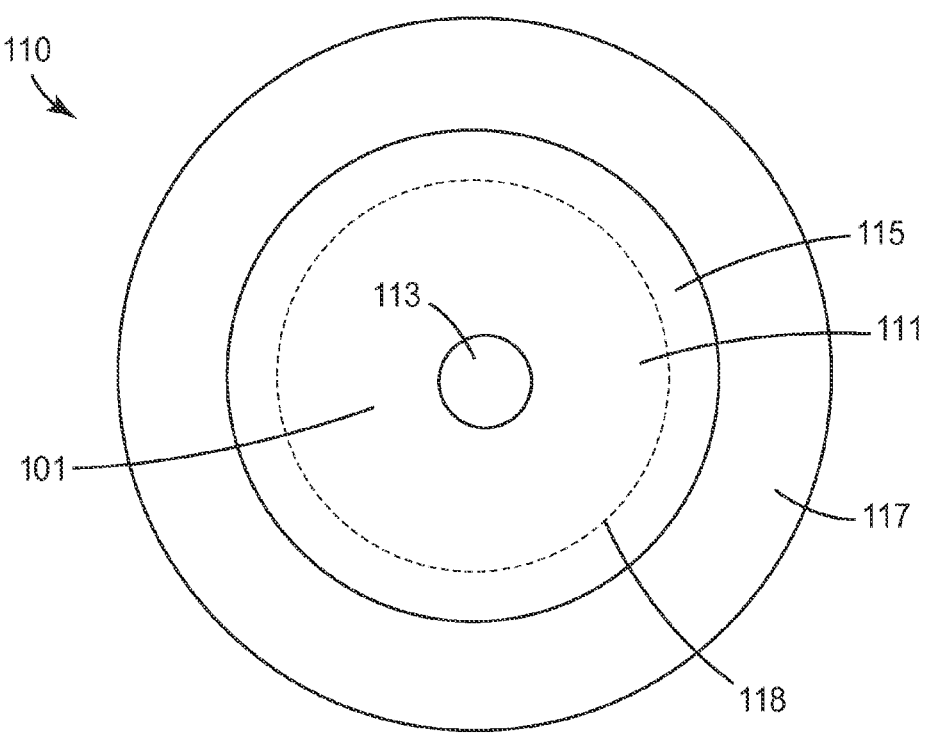
FIG. 1B is a front view of a contact lens.

FIG. 1B shows a front view of contact lens 110. In the illustrated embodiment, first region 113 is a substantially circular region near the center of second region 115 which in an annular shaped region surrounding first region 113. In other embodiments, first region 113 has an oval or other geometry and may not be centered in second region 115. Contact lens 110 also includes a third region 117 extending from the second region 115 to an edge of contact lens 110. In other embodiments, second region 115 extends to an edge of contact lens 110.

In some embodiments, the contact lens includes a first portion 101 having the property that at least some light incident on the first portion 101 of the contact lens is transmitted into the pupil of a person wearing the contact lens. The first portion 101 may include first region 113 and all or part of second region 115. In the embodiment illustrated in FIG. 1B, the first portion 101 includes the substantially circular region bounded by line 118. This includes all of first region 113 and a major part of second region 115. In some embodiments, the contact lens includes a second portion which includes third region 117. Light incident on the second portion is not transmitted into the pupil of a person wearing the contact lens. The second portion may be included so that the contact lens fits an eye more comfortably.

In some aspects of the present description, a contact lens 110 is provided that includes a lens substrate and that has a first portion 101 configured to direct a light incident on the first portion 101 of the contact lens 110 into a pupil of a user where the first portion 101 includes a first region 113 and an additional region 111 including part or all of second region 115 surrounding the first region 113. In FIG. 1B, the additional region 111 is the region inside line 118 and outside of first region 113. The first region 113 may incorporate one or more optical elements which do not extend into the second region. The one or more optical elements may be at least partially embedded with the lens substrate or may be disposed on an outer major surface 114 of the substrate as described elsewhere. The one or more optical elements may include glass having a high refractive index. For example the glass may have a refractive index higher than about 1.8, or higher than about 1.8, or higher than about 2, or higher than about 2.1. As used herein, refractive index refers to refractive index measured using light having a wavelength of 532 nm at 25° C. and atmospheric pressure unless otherwise indicated. Suitable high index glasses are described, for example, in U.S. Pat. No. 2,870,030 (Stradley et al.).

The one or more optical elements may be a monolithic lens which may have a refractive index that differs from a refractive index of the lens substrate. The monolithic lens may be a relatively thick refractive lens or a relatively thin diffractive lens. Alternatively, the one or more optical elements may be an array of discrete monolithic lenses. The lenses may focus light incident on the first region onto the retina of an eye of a person wearing the contact lens. The monolithic lens or lenses may be plano-convex, or biconvex, or other types of lenses may be used. The lens or lenses may be made from glass having a high refractive index as described elsewhere. Using a lens made from high refractive index glass provides a large refractive index difference between the lens and a polymeric material that may be used in the substrate.

In some embodiments, the first region includes one or more monolithic lenses and the second region includes a notch filter. In some embodiments, the notch filter is formed by including one or more pluralities of pigments that absorb in one or more narrow wavelength bands in a polymeric material used to make the contact lens. The contact lens may be made using a molding process where the lens or lenses are molded into the first region so that the first region contains much less of the polymeric material, and therefore much less of the pigments, than the second region. In some embodiments, the pigments include metal phthalocyanines such as copper phthalocyanine.

In some embodiments, the one or more optical elements may include at least one of a multilayer birefringent polymeric optical film, a reflective polarizer, a multilayer birefringent polymeric reflective polarizer and an absorbing polarizer adjacent the multilayer birefringent polymeric reflective polarizer and facing an outer major surface 114 of the contact lens 110. In some embodiments, the additional region 111 which includes part or all of second region 115 incorporates a multilayer birefringent polymeric optical film, which may be a reflective polarizer and may extend throughout second region 115. The additional region 111 may also incorporate a quarter-wave layer adjacent the reflective polarizer. The quarter-wave layer may face outer major surface 114. The multilayer birefringent polymeric optical film may include a group of alternating birefringent polymer layers and may include an absorbing polarizer adjacent the group of alternating birefringent polymeric layers. In some embodiments, the additional region 111 incorporates a first reflective circular polarizer that transmits light having a first circular polarization and reflects light having a second circular polarization, and the one or more optical elements includes a second reflective polarizer that transmits light having the second circular polarization and reflects light having the first circular polarization.

Figure 2:
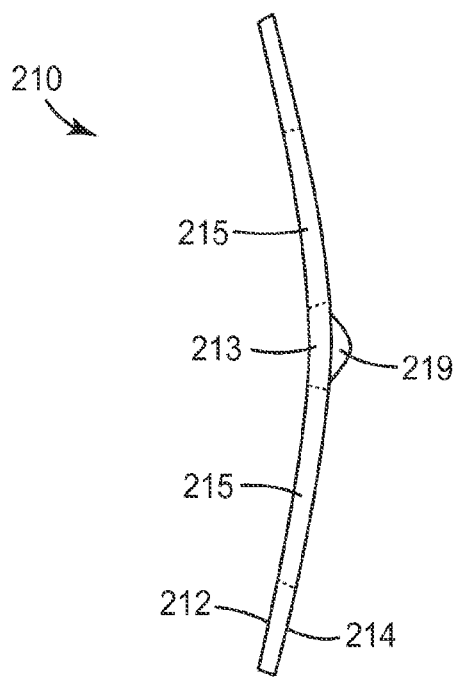
FIG. 2 is a cross-sectional view of a contact lens.

FIG. 2 is a cross-sectional view of contact lens 210 including first region 213, second region 215 and an optical element 219 disposed on outer major surface 214 opposite inner major surface 212 of contact lens 210. Optical element 219 may be a lens which focuses light incident on first region 213 onto a focal point which may be a point on the retina of an eye wearing the contact lens 210. Alternatively, optical element 219 may be embedded at least partially within a lens substrate in first region 213. If optical element 219 is embedded at least partially within a lens substrate, optical element 219 may extend through outer major surface 214, through inner major surface 212 or through both major surfaces 212 and 214. Optical element 219 may be at least partially embedded within a lens substrate using conventional ophthalmic-quality insert molding processes.

Figure 3A:
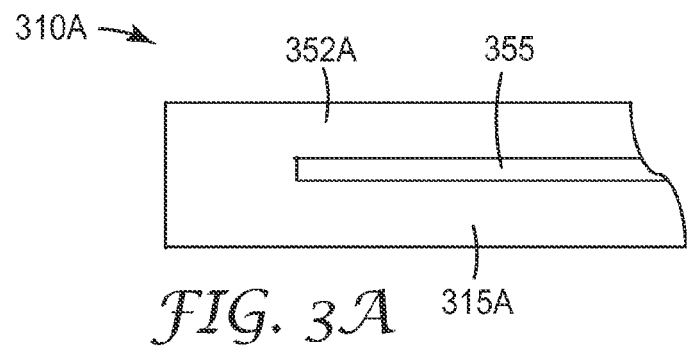
FIGS. 3A-3C are cross-sectional views of portions of contact lenses.

FIG. 3A shows a portion of contact lens 310A near an outer edge of a second region 315A. Contact lens 310A includes a substrate 352A which may be a polymeric substrate that can be formed around a component 355 as illustrated in FIG. 3A using, for example, conventional ophthalmic-quality insert molding processes. Component 355 may be an optical element, such as one or more of a reflective polarizer, an absorbing polarizer, a multilayer birefringent polymeric optical film. Alternative positions of component 355 are illustrated in FIGS. 3B-3C.

Figure 3B:
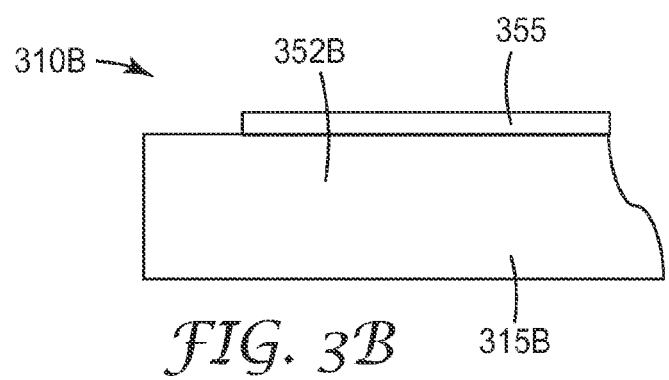
Figure 3C:
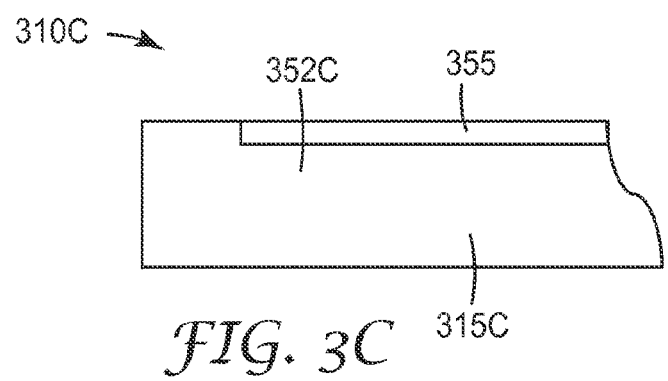

FIG. 3B shows a portion of contact lens 310B near an outer edge of a second region 315B. Contact lens 310B includes the component 355 disposed on a substrate 352B. Contact lens 310B can be made using conventional insert molding processes. FIG. 3C shows a portion of contact lens 310C near an outer edge of a second region 315C. Contact lens 310C includes the component 355 disposed on a substrate 352C with a major surface of component 355 flush with a major surface of the substrate 352C. Contact lens 310C can be made using conventional insert molding processes. The major surface of the contact lens 310B or 310C contacting component 355 may be an inner surface or an outer surface of the contact lens.

Figure 3D:
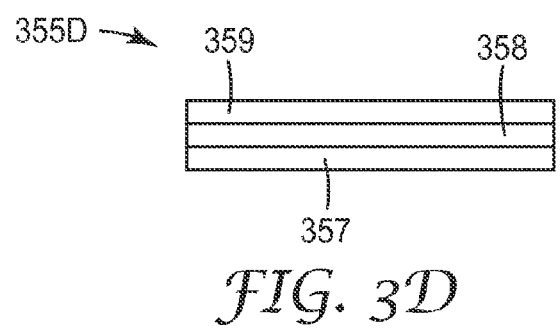
FIG. 3D is a cross-sectional view of a component that may be included in a contact lens.

In some embodiments, component 355 may include more than one layer. This is illustrated in FIG. 3D which shows a component 355D having a reflective linear polarizer 357, an absorbing linear polarizer 358 and a quarter-wave layer 359 which may be disposed facing an eyewear lens. Component 355D is a circular polarizer which transmits a first circular polarization and absorbs or partially absorbs and partially reflects a second circular polarization that is substantially orthogonal to the first circular polarization.

Figure 4A:
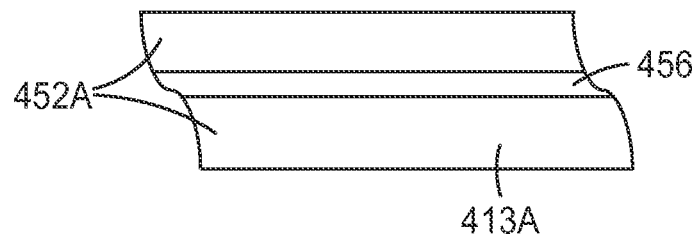
FIGS. 4A-5D are cross-sectional views of portions of contact lenses.

FIG. 4A shows a portion of contact lens 410A in a first region 413A. Contact lens 410A includes a substrate 452A which may be a polymeric substrate that can be formed around a component 456 as illustrated in FIG. 4A using, for example, conventional insert molding processes. In the portion of the contact lens 410A illustrated in FIG. 4A, substrate 452A has a lower portion under component 456 and an upper portion above component 456. Near an edge of the contact lens 410A, the two portions of the substrate 452A may merge together. Component 456 may be an optical element, such as one or more of a reflective polarizer, an absorbing polarizer, a multilayer birefringent polymeric optical film, and a lens. In some embodiments, component 456 is a lens embedded within the lens substrate 452A.

Figure 4B:
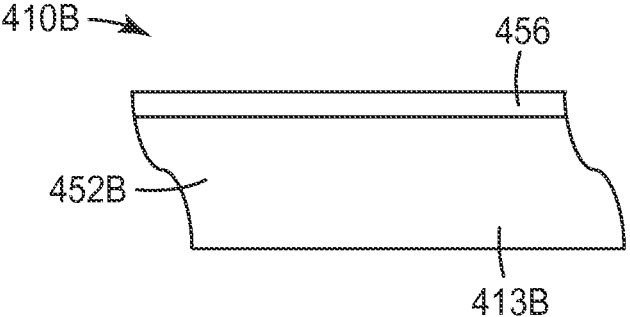

FIG. 4B shows a portion of contact lens 410B in a first region 413B. Contact lens 410B includes the component 456 disposed on a substrate 452B. Contact lens 410B can be made using conventional insert molding processes. The major surface of the contact lens 410B contacting component 456 may be an inner surface or an outer surface of the contact lens.

Figure 4C:
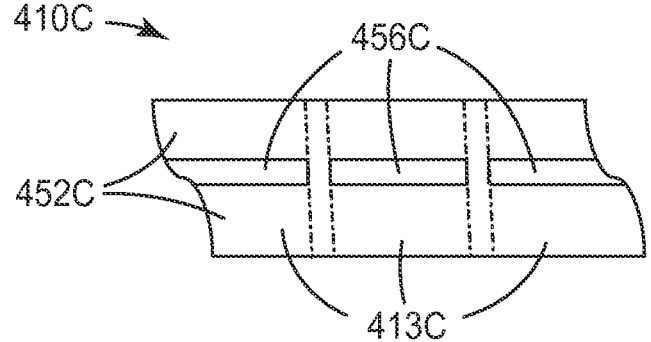

As discussed further elsewhere, the first region may include a plurality of discrete zones. FIG. 4C shows a portion of contact lens 410C that includes a first region 413C having discrete zones. Contact lens 410C includes a substrate 452C which may be a polymeric substrate that can be formed around a plurality of components 456C as illustrated in FIG. 4C using, for example, conventional insert molding processes. In the portion of the contact lens 410C illustrated in FIG. 4C, substrate 452C has a lower portion under plurality of components 456C and an upper portion above plurality of components 456C. Near an edge of the contact lens 410C, the two portions of the substrate 452C may merge together. Plurality of components 456C may be a plurality of optical elements and each optical element may be one or more of a reflective polarizer, an absorbing polarizer, a multilayer birefringent polymeric optical film, and a lens. In some embodiments, plurality of components 456C is a plurality of lenses embedded within the lens substrate 452C.

Figure 5A:
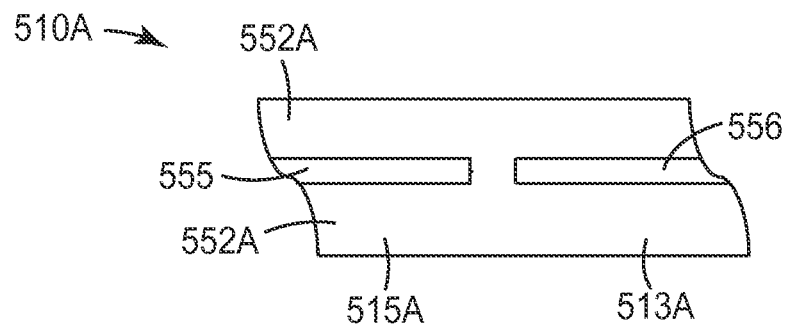
FIG. 5E is a cross-sectional view of an optical film that may be included in a contact lens.
Figure 5B:
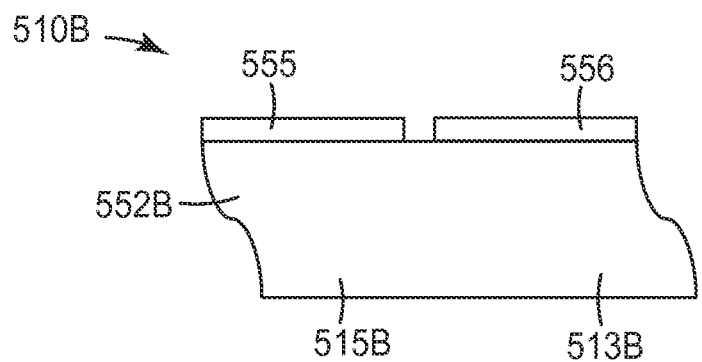
Figure 5C:
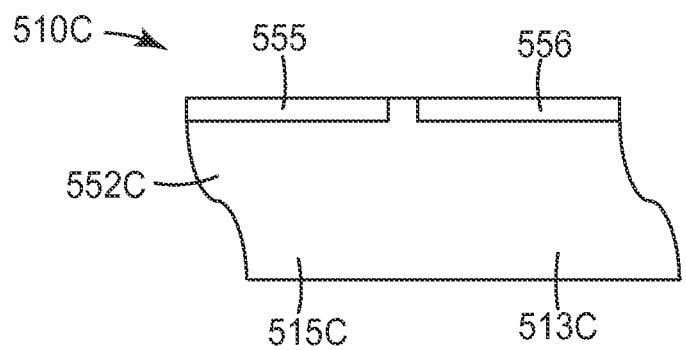

FIG. 5A shows a portion of contact lens 510A near where the first region 513A and second region 515A meet. First region 513A includes a first component 556 embedded in substrate 552A and second region 515A includes a second component 555 embedded in substrate 552A. Instead of having the first and second components embedded in the substrate, the first and/or second components may be only partially embedded in the substrate or may be disposed on a major surface of the substrate. FIG. 5B shows a portion of contact lens 510B near where the first region 513B and second region 515B meet. First region 513B includes a first component 556 disposed on a major surface of substrate 552B and second region 515B includes a second component 555 disposed on the major surface of substrate 552B. In some embodiments, the first and second components are flush with a major surface of the substrate as illustrated in FIG. 5C which shows a portion of contact lens 510C near where the first region 513C and second region 515C meet. First region 513C includes a first component 556 disposed on a major surface of substrate 552C and second region 515C includes a second component 555 disposed on the major surface of substrate 552C. Any of the contact lenses 510A, 510B and 510C can be made using conventional insert molding techniques.

Figure 5D:
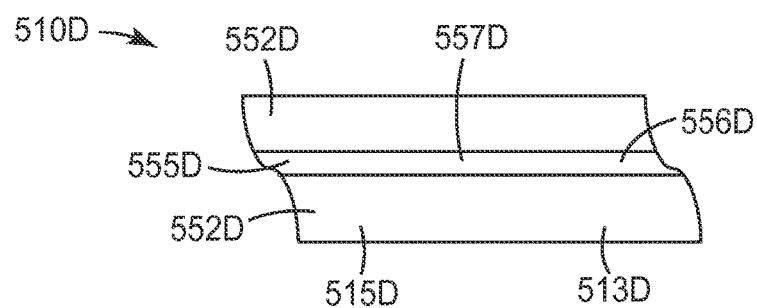
Figure 5E:
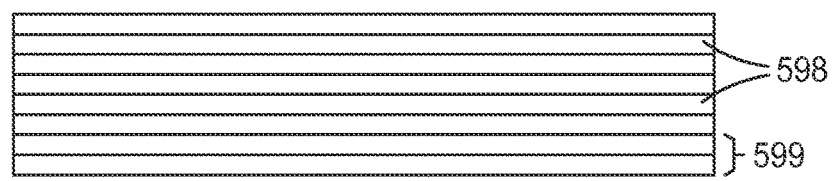

An alternative to using separate components 555 and 556 is to use a single component having different properties in the first and second regions. FIG. 5D shows a portion of contact lens 510D near where the first region 513D and second region 515D meet. First region 513D includes a first portion 556D of an optical film 557D embedded in substrate 552D and a second portion 555D embedded in substrate 552D. An alternative to having optical film 557D at least partially embedded in the substrate 552D is to have optical film 557D disposed on a major surface of the substrate. Methods for spatially tailoring optical films such as multilayer birefringent polymeric optical films or quarter-wave layers are described elsewhere. Optical film 557D may be a multilayer optical film as illustrated in FIG. 5E which shows multilayer optical film 557E containing microlayers 598 arranged into optical repeat units 599.

Figure 6A:
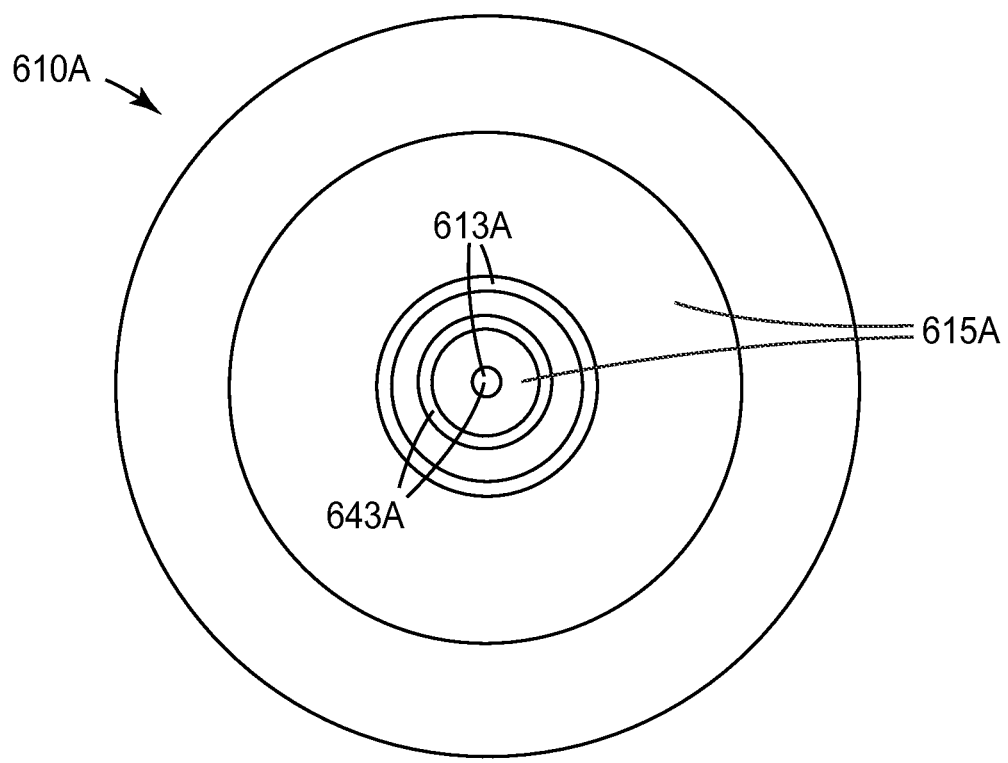
FIG. 6A is a front view of a contact lens.

In some embodiments, the first region includes a plurality of discrete zones surrounded by the second region. This is illustrated in FIG. 6A which shows a front view of contact lens 610A including first region 613A and second region 615A. First region 613A includes a plurality of discrete zones 643A so that first region 613A is not connected. First region 613A includes a central region and a plurality of concentric rings. First region 613A is bounded by second region 615A. As used herein, a first region of a contact lens is bounded by a second region if every internal line bounding the first region is also a portion of a boundary of the second region. In contact lens 610A, every line bounding first region 613A is a portion of a boundary of second region 615A. Any number of discrete zones 643A may be used and the discrete zones 643A may be arranged in any pattern. In some embodiments, each discrete zone 643A includes a monolithic lens. In some embodiments, contact lens 610A includes an array of optical elements, such an array of monolithic lenses or an array of discrete portions of optical films. An array of discrete portions of optical films can be prepared, for example, by die cutting or laser cutting portions out of a multilayer birefringent polymeric optical film or by spatially tailoring multilayer optical films as described elsewhere.

Figure 6B:
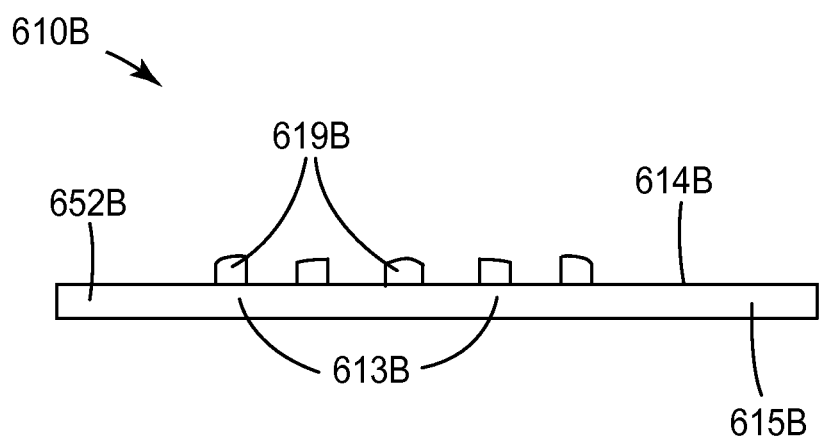
FIG. 6B is a side view of a portion of a contact lens.

In some embodiments, first region 613A includes a Fresnel lens. This is illustrated in FIG. 6B which shows a portion of contact lens 610B corresponding to a center region of contact lens 610A. First region 613B incorporates Fresnel lens elements 619B which do not extend into second region 615B. In the illustrated embodiment, lens elements 619B are incorporated in first region 613B by being disposed on outer major surface 614B of the lens substrate 652B. In other embodiments, lens elements 619B are embedded at least partially within lens substrate 652B.

Figure 7A:
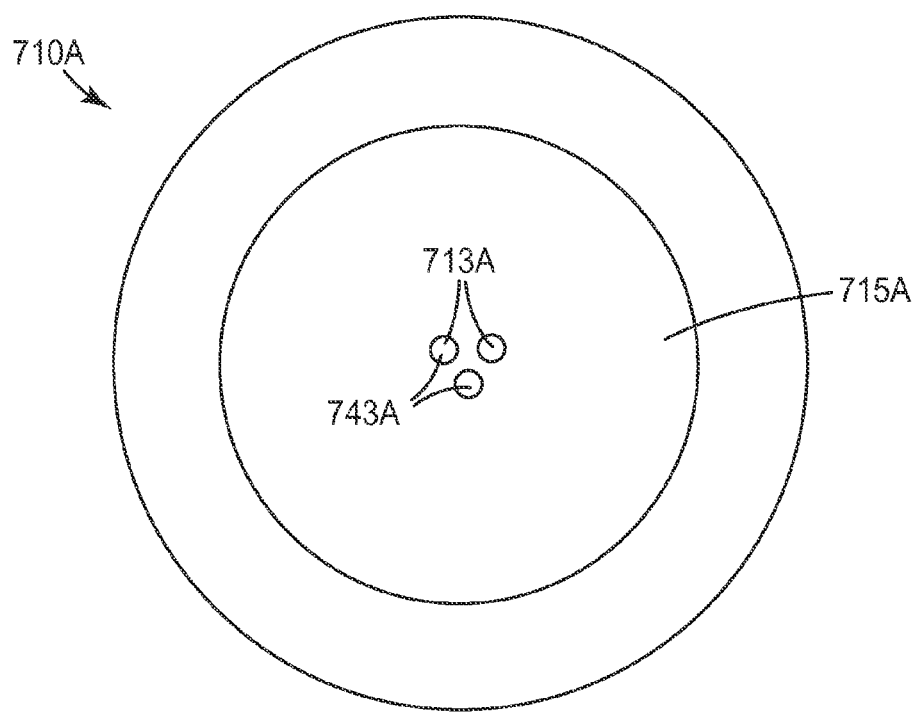
FIGS. 7A-9 are front views of contact lenses.
Figure 7B:
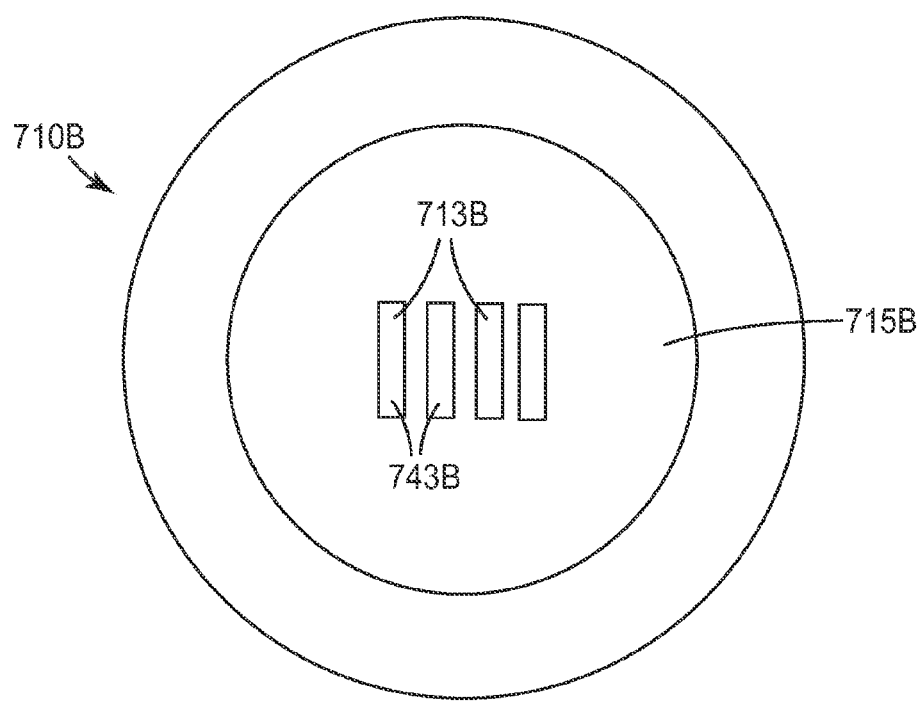

An alternate geometry is shown in FIG. 7A which shows a front view of contact lens 710A including first region 713A and second region 715A. First region 713A includes a plurality of discrete zones 743A and first region 713A is bounded by second region 715A. Another geometry is shown in FIG. 7B which shows a front view of contact lens 710B including first region 713B and second region 715B. First region 713B includes a plurality of discrete zones 743B and first region 713B is bounded by second region 715B. As discussed further elsewhere, using multiple discrete zones such as 743A or 743B has been found to provide various benefits such as an increased field of view, improved contrast and improved image quality compared to using a single continuous first region. In some embodiments, second region 715A or 715B incorporates at least one optical film that spans the second region 715A or 715B and that does not extend into the first region 713A or 713B, respectively. The at least one optical film may be one or more of a multilayer birefringent polymeric optical film, a reflective polarizer, an absorbing polarizer, and a notch filter.

First regions 613A, 613B, 713A and 713B are not connected and are therefore not simply connected. In some embodiments, the first region is a continuous, connected region and is path-connected (i.e., there is a path within the first region connecting any two points of the first region) but is not simply connected (i.e., not every path within the first region between two end points of the first region can be continuously transformed into any other path between the two end points while preserving the end points). This is illustrated in FIGS. 8A-9.

Figure 8A:
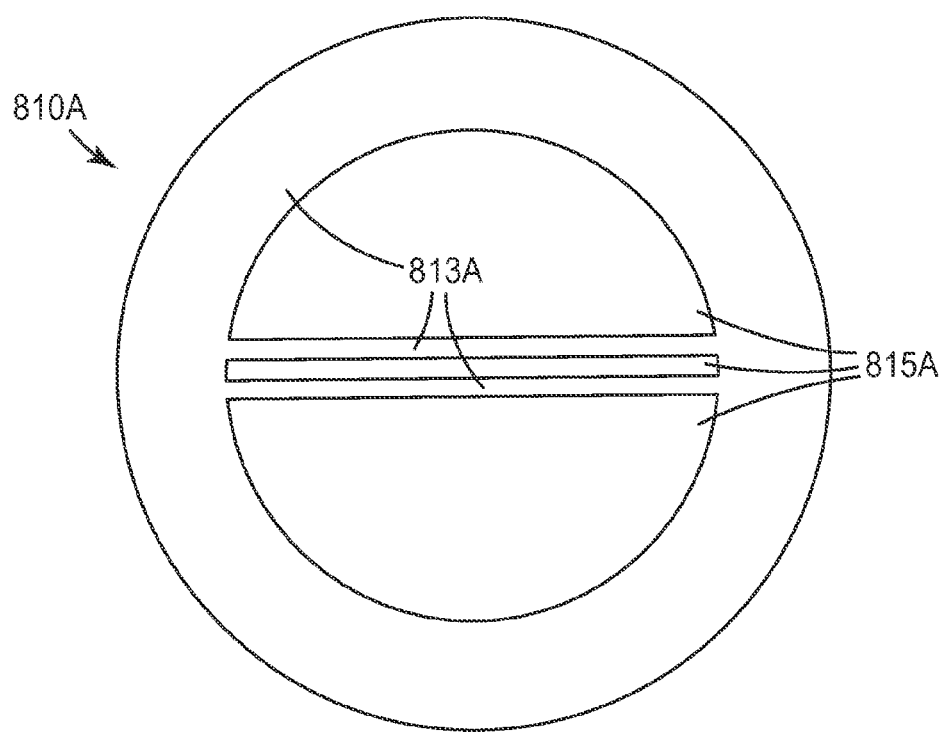
Figure 8B:
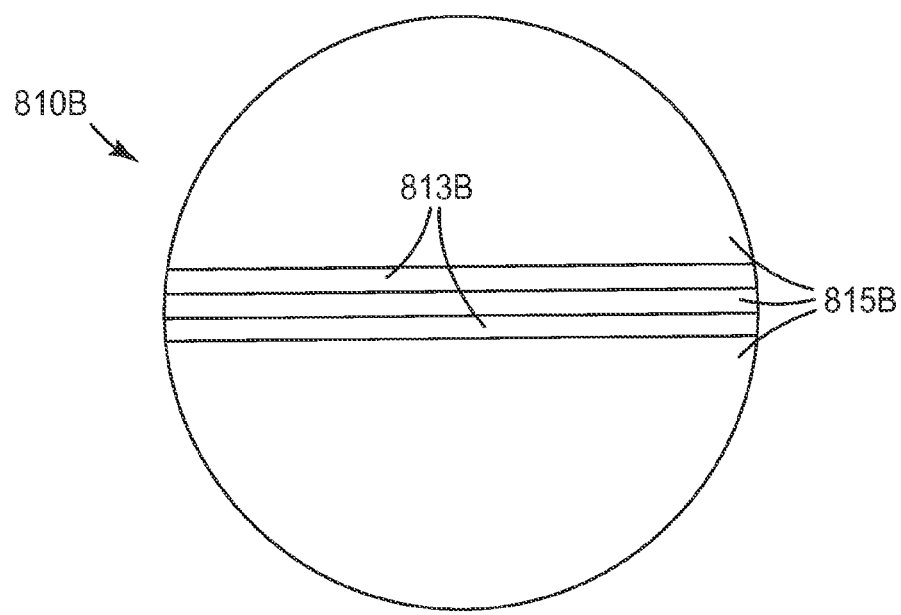

FIG. 8A shows a front view of contact lens 810A including first region 813A and second region 815A. Second region 815A is bounded by first region 813A. That is, every internal line bounding second region 815A is a portion of a boundary of first region 813A. First region 813A is connected and path-connected and first region 813A is not simply connected. An alternate embodiment is shown in FIG. 8B where the first and second regions are extended to an outer edge of contact lens 810B. Second region 815B is bounded by first region 813B since every internal line bounding second region 815B is a portion of a boundary of first region 813B. Since second region 815B extends to the boundary of the contact lens 810B in this case, the eternal boundary of the contact lens is part of the boundary of second region 815B. In this case, first region 813B is not connected and therefore not simply connected.

Figure 9:
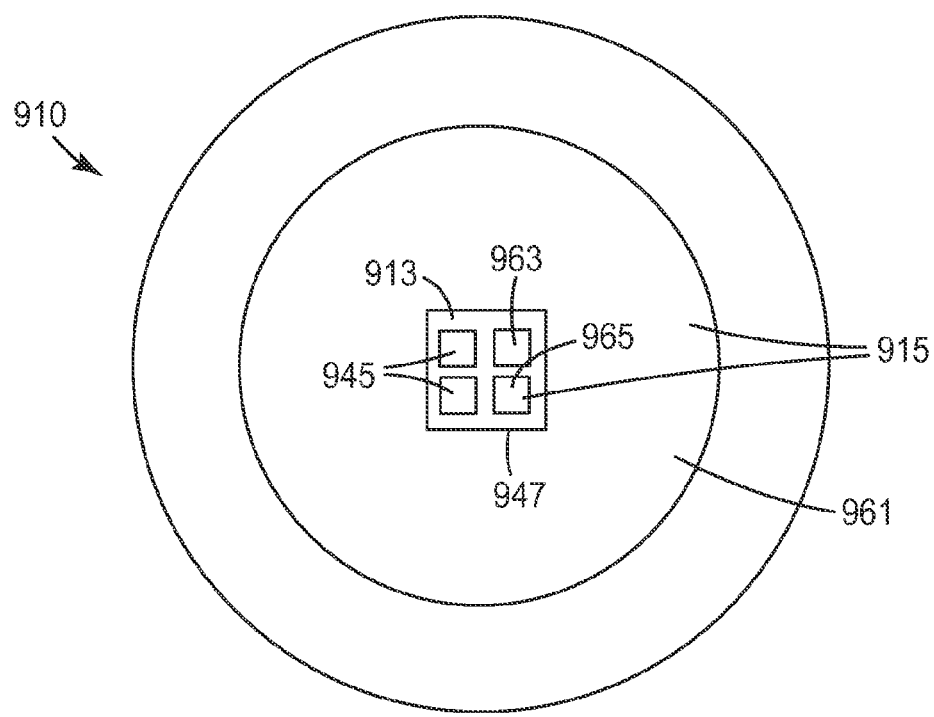

FIG. 9 shows a front view of contact lens 910 including first region 913 and second region 915. First region 913 is a continuous, connected zone or region which is not simply connected. First region 913 is bounded by second region 915. First region 913 has an outer boundary 947. Second region 915 includes an outer region 961 outside of outer boundary 947 and includes inner region 963 disposed within the outer boundary 947. Inner region 963 includes at least one disconnected portion 965 of the second region. In the embodiment illustrated in FIG. 9, inner region 963 includes four disconnected portions 965.

The second regions of the embodiments illustrated in FIGS. 6A-9 may include at least one optical film. The at least one optical film may include a multilayer birefringent polymeric optical film. In some embodiments, the first region (e.g., 613A, 613B, 713A, 713B, 813A, 813B, 913) includes a first optical film different from the at least one optical film. In some embodiments, the at least one optical film includes a reflective first polarizer configured to transmit light having a first polarization. In some embodiments, the first region includes a second polarizer configured to reflect or absorb light having the first polarization. In some embodiments, the at least one optical film includes a multilayer birefringent polymeric reflective polarizer and the first region is substantially optically clear. In some embodiments, the at least one optical film includes a plurality of layers with at least one layer including a photochromic material which may be included in nanoparticles disbursed in the layer as described elsewhere. In some embodiments, the at least one optical film includes a micro-perforated multilayer birefringent polymeric optical film. In some embodiments, the at least one optical film includes plurality of layers continuously extending through the first and second regions, where in the first region, the plurality of layers provides a first reflective characteristic, and in the second region, the plurality of layers provides a second reflective characteristic different from the first reflective characteristic as described elsewhere.

For example, second region 915 includes at least one optical film. Disconnected portions 965 may include portions of the same optical film as outer region 961 or may include different optical films. Contact lens 910 (or contact lens 610A, 610B, 710A, 710B, 810A, or 810B) can be made by die cutting or laser cutting sections out of an optical film or by using spatially tailored optical film as described elsewhere.

Using non-simply connected first regions, such as those illustrated in FIGS. 6A-9, has been found to provide several benefits compared to using a simply connected first region. For example, the field of view may be improved since having off-centered elements pointing off-axis helps collect more off-axis light. The contrast ratio may also be improved since the size of the first region may be increased relative to a single simply connected region without significantly sacrificing the real-world view and this can result in improved brightness of the virtual image produced by the illuminator. The image quality of the ambient image may be improved by distributing the first region over a larger area of the contact lens since this results in lower local perturbation to the ambient view from the first region. The image quality of the virtual image can also be improved since the multiple elements that may be include in the first region need not be identical and can be designed to increase image quality, for example, by reducing astigmatism and distortions and/or by improving the display system's tolerance to misalignment/position offsets.

In some embodiments, the first region (e.g., 213, 613A, 613B, 713A, 713B, 813A, 813B, 913) includes a focusing element (e.g., element 219 of FIG. 2 or elements 619B of FIG. 6B) disposed on an outer surface of the first region or embedded at least partially in a substrate of the contact lens in the first region. The focusing element may be a lens that is die cut, for example, to have a shape corresponding to the shape of the first region. Alternatively, the focusing element may be an array of lenses disposed on an outer surface of the first region or embedded at least partially in a substrate of the contact lens in the first region. The focusing element may be included to focus light that is diffusely scattered from the eyewear lens into the first region onto the retina of an eye of a person wearing the contact lens.

Figure 10:
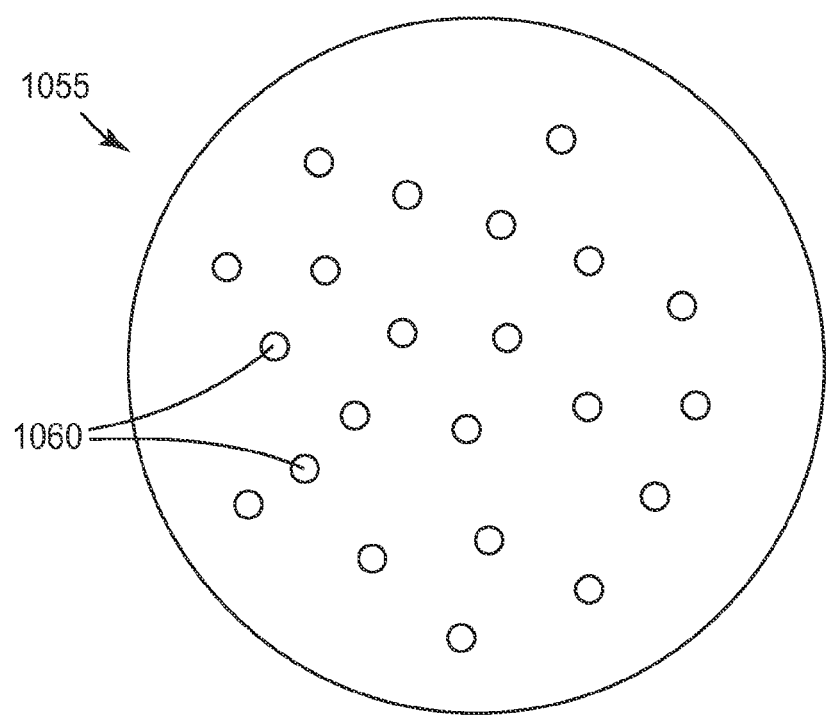
FIG. 10 is a schematic front view of a micro-perforated optical film.

It is typically desired for contact lenses to allow gasses, for example, oxygen and carbon dioxide, to diffuse through the lens material in order for the lens to feel comfortable when worn and to maintain the health of the cornea. The breathability or gas-permeability of the contact lens can be influenced by the choice of material used in any optical films included in the contact lens. In some embodiments, a multilayer birefringent polymeric optical film is included in a contact lens where the multilayer birefringent polymeric optical film includes alternating layers of a birefringent polymer and a silicone. Using a silicone for one of the layers can improve the breathability of the optical film. Any of the optical films or components incorporated into the contact lenses of the present description may be micro-perforated. This is illustrated in FIG. 10 which shows a front view of optical component 1055 having micro-perforations 1060. Optical component 1055 may be any of the optical components described elsewhere that can be incorporated into a contact lens. For example, optical component 1055 may be a multilayer birefringent polymeric optical film and may be a reflective polarizer. In some embodiments, a larger hole is provided in a region of component 1055 so that component 1055 does not extend into the first region when incorporated into a contact lens.

Perforating the optical film improves gas-permeability of the film which can help maintain cornea health and improve the comfort of a lens incorporating the optical film. Perforations can be created using laser cutting, for example. Suitable lasers include excimer lasers. Multilayer optical films have been perforated using a COMPexPro™ 110F excimer laser (available from COHERENT, Inc., Santa Clara, Calif.) with settings of 300 pulses per pattern position, repeat rate of 50 Hz, 600 mJ/cm$^2$ and a wavelength of 248 nm. Alternatively, track-etching techniques can be used to make small (e.g., less than 1 micron) diameter perforations as described in "Track etching technique in membrane technology", Apel, Radiation Measurements 34 (2001) 559-566. Using small perforations allow for a minimal effect on the optical properties of the film. In some embodiments, the optical film includes holes having diameters greater than about 10 nm, greater than about 0.1 microns, greater than about 0.5 microns, greater than about 1 micron, greater than about 5 microns, greater than about 10 microns, or greater than about 15 microns and less than about 100 microns, or less than about 150 microns, or less than about 200 microns, or less than about 300 microns. Holes having diameters larger than about 300 microns can degrade the optical properties of the optical film and holes having diameter below about 10 nm can be difficult to make using a laser cutting or track-etching techniques. In some embodiments, the optical film has a total perforation open area greater than about 0.1 percent, or greater than about 0.2 percent, or greater than about 0.5 percent, or greater than about 1 percent, or greater than about 2 percent, and less than about 5 percent, or less than about 8 percent, or less than about 10 percent, or less than about 15 percent. This has been found to provide sufficient breathability without substantially damaging the optical properties of the film.

In some aspects of the present description, a contact lens is provided that includes a lens substrate incorporating a micro-perforated multilayer birefringent polymeric optical film. As used herein, micro-perforations refer to perforations having a size (e.g., diameter) less than 1 mm and may include perforations having nanoscale (less than 1 micron) diameters. The multilayer birefringent polymeric optical film may be a reflective polarizer and may include a notch filter. The multilayer birefringent polymeric optical film may include at least one layer that includes a photochromic material which may be incorporated into nanoparticles as described elsewhere. The multilayer birefringent polymeric optical film may be embedded in the lens substrate as in the embodiment illustrated in FIG. 3A, for example. The contact lens may have a first region and a second region and the micro-perforated optical film may be included in one or both of the first and second regions. The contact lens may include an annular region (corresponding to second region 115 in the embodiment illustrated in FIG. 1B) and a central region (corresponding to first region 113 in the embodiment illustrated in FIG. 1B). The annular region may include a first multilayer birefringent polymeric optical film that does not extend into the central region and the central region may include a second multilayer birefringent polymeric optical film.

In some embodiments, the lens substrate incorporates a color-blind corrective optical filter where the optical filter includes a micro-perforated optical film. Suitable color-blind corrective optical filters are described in WO 2014/110101 (Wold et al.). Such filters may include an absorptive magenta layer disposed on a side of a multilayer birefringent polymeric optical film (for example, on a side facing an inner surface of a contact lens or facing a user wearing the contact lens) where the absorptive magenta layer selectively absorbs green light. Suitable magenta layers can be made by coating a dye onto a clear carrier film as described in WO 2014/110101 (Wold et al.). Suitable dyes include Epolight™ 5391 Visible Light Dye, sold by Epolin, Inc., Newark, N.J.

The color-blind corrective optical filter may include a multilayer birefringent polymeric optical film that has a strong but narrow rejection band at or near 550 nm, but that has relatively high transmission for other visible wavelengths. Thus, for example, the multilayer optical film may have, at a design angle of incidence (e.g. normal incidence), an average internal transmission of at least 50% or at least 60% from 420-680 nm. The multilayer optical film may also have at the design angle of incidence an average internal transmission of 10% or less, or 5% or less, or 2% or less, or 1% or less over a 10 nm wide wavelength range that includes 550 nm, this reduced transmission being associated with a reflection band having a width (Full Width at Half Maximum (FWHM)) of 60 nm or less, or 50 nm or less, or in a range from 20 to 50 or 20 to 40 nm. Optical properties of multilayer optical films are sometimes specified at normal incidence, or at a different incidence direction of interest, because the transmission and reflection characteristics of a multilayer optical film can substantially change as a function of the incident direction of the light. The multilayer birefringent polymeric optical film may have at normal incidence, an average internal transmission from 420-680 nm of at least 50%, and may have at normal incidence an average internal transmission of 10% or less over a 10 nm wide wavelength range that includes 550 nm and that is associated with a reflection band having a width (FWHM) of 60 nm or less.

In one case, a multilayer optical film suitable for used in a color-blind corrective optical filter was made with a stack of 223 individual microlayers, the microlayers alternating between polyethylene terephthalate (PET) polymer material and co-polymethyl methacrylate (coPMMA) polymer material. The layer thickness profile of the stack was tailored to produce a first-order reflection band in the infrared region of the spectrum. The 3$^{rd}$ order harmonic of the IR reflection band was in the visible region at or near 550 nm. The measured external transmission of this film at normal incidence, in the range from 400 to 700 nm, is shown as curve 1801 in FIG. 18. The visible light reflection band 1801a of this film can be readily identified in the figure. The FWHM bandwidth of reflection band 1801a is approximately 50 nm.

In some embodiments, an optical film extends throughout the first and second regions and the optical properties of the optical film are different in the first and second regions. The contact lenses illustrated in FIGS. 1B and 6A-9 can be made by using an optical film that extends through the first and second regions where the portions of the optical film in the first regions have been modified. For example, referring to FIG. 5D, optical film 557D is a continuous film extending through first region 513D and second region 515D. The first portion 556D of optical film 557D in first region 513D is modified so that it has different optical properties than second portion 555D of optical film 557D in second region 515D.

In some embodiments, the contact lens includes a lens substrate having a first region and a second region and incorporating a multilayer optical film having a plurality of layers continuously extending through the first and second regions. In the first region, the plurality of layers provides a first reflective characteristic and in the second region, the plurality of layers provides a second reflective characteristic different from the first reflective characteristic. Such a multilayer optical film can be made by starting with a multilayer birefringent polymeric optical film and selectively heating the region of the film corresponding to the first region of the contact lens to reduce or substantially eliminate the birefringence in that region. In this case, the first reflective characteristic may include reflection of light having a first polarization and transmission of light having a second polarization and the second reflective characteristic may include substantial transmission of both the first and the second polarization. Such spatially tailored optical films and methods of making are described in U.S. Pat. App. Pub. No. 2011/0255163 (Merrill et al.).

In some embodiments, the selective heating is achieved at least in part by selective delivery of light or other radiant energy to the first region of the film. The light may include ultraviolet, visible, or infrared wavelengths, or combinations thereof. At least some of the delivered light is absorbed by the film to provide the desired heating, with the amount of light absorbed being a function of the intensity, duration, and wavelength distribution of the delivered light, and the absorptive properties of the film. Such a technique for internally patterning a multilayer optical film is compatible with known high intensity light sources and electronically addressable beam steering systems, thus allowing for the creation of virtually any desired pattern or image in the film by simply steering the light beam appropriately, without the need for dedicated hardware such as image-specific embossing plates or photomasks. In some embodiments, the multilayer optical film may include one or more absorbing agents in one or more constituent layers to promote heating during the patterning procedure.

A suitable multilayer optical film 557E is illustrated in FIG. 5E. In some embodiments, the plurality of layers of the multilayer optical film 557E includes at least one stack of microlayers 598 arranged into optical repeat units 599, each optical repeat unit 599 including a first microlayer that is birefringent in the second region and less birefringent or isotropic in the first region. In some embodiments, the multilayer optical film 557E transmits light having a first polarization state incident on the second region, reflects light having a second polarization state incident of the second region, and transmits light incident on the first region having the first or the second polarization state. In some embodiments, the second region in an annular region surrounding the first region as illustrated, for example, in FIG. 1B. In some embodiments, the multilayer optical film is microperforated as described elsewhere.

The eyewear lens may include a diffusely reflecting polarizer. Such a polarizer may include a disperse phase of polymeric particles disposed within a continuous polymer. The polarizer may be a film which can be oriented by stretching in one or more directions. The size and shape of the disperse phase particles, the volume fraction of the disperse phase, the film thickness, and the amount of orientation may be chosen to attain a desired degree of diffuse reflection and total transmission of electromagnetic radiation of a desired wavelength in the resulting film. Suitable diffusely reflecting polymeric linear polarizers are described in U.S. Pat. No. 5,825,543 (Ouderkirk et al.) and U.S. Pat. No. 5,867,316 (Carlson et al.).

Suitable diffusely reflecting polarizers also include specularly reflecting polarizers with a diffuser layer adjacent the specularly reflecting polarizer facing the imaged light source. Suitable diffuser layers include polymer dispersed liquid crystal (PDLC) layers. The combination of a weak diffuser and specular reflective polarizer may allow for high reflectivity with low haze and high clarity in transmission.

In some embodiments, the polarizer is obtained by stretching a PDLC layer to produce a diffusely reflective polymeric linear polarizer as described, for example, in "Optomechanical Properties of Stretched Polymer Dispersed Liquid Crystal Films for Scattering Polarizer Applications", Amimori et al., J. Appl. Phys. 93, 3248 (2003).

The suitability of using a diffusely reflective polarizer in an eyewear lens of a display system was tested using a projector, a linear polarizer film and a diffusely reflective polarizer. The diffusely reflective polarizer was a film having a disperse phase of polymeric particles disposed within a continuous polymer as described in U.S. Pat. No. 5,825,543 (Ouderkirk et al.). The projector was used to project content onto a projection screen. The polarizer film was placed in front of the output from the projector and the diffusely reflective polarizer was placed between the polarizer film and the projection screen. The diffusely reflective polarizer was viewed at an off-normal angle. When the pass axis of the linear polarizer film was aligned with the reflection axis of the diffusely reflective polarizer, the projected image was clearly visible on the diffusely reflective polarizer. When the pass axis of the linear polarizer film was aligned with the pass axis of the diffusely reflective polarizer, the content on the projection screen was clearly visible through the diffusely reflective polarizer. This indicated that the diffusely reflective polarizer was suitable for use in an eyewear lens for scattering imaged light from an illuminator to a viewer and for transmitting ambient light to the viewer.

In some embodiments, a diffuse reflective polarizer, which may include a disperse phase of polymeric particles disposed within a continuous polymer or may include a PDLC reflective polarizer, is combined with an absorbing polarizer. The absorbing polarizer may be disposed facing an outer surface of an eyewear lens and the diffuse reflective polarizer may be disposed facing an inner surface of the eyewear lens. The diffuse reflective polarizer provides the desired scattering of light from an illuminator and the absorbing polarizer prevents the eyewear lens from having potentially objectionable reflections from the outer surface.

FIG. 11 shows eyewear lens 1120 including a first substrate 1170 and one or more optical films 1172 adjacent first substrate 1170. Eyewear lens 1120 includes an inner major surface 1174 and an opposite outer major surface 1176. In the embodiment illustrated, the one or more optical films 1172 does not cover all of the first substrate 1170 and as a result, inner major surface 1174 includes a major surface 1175 of the one or more optical films 1172 and a portion of a major surface of first substrate 1170. Major surface 1175 faces the inner major surface 1174 of the eyewear lens. In other embodiments, the one or more optical films 1172 covers all or substantially all of the first substrate 1170. First substrate 1170 is adjacent the one or more optical films 1172 opposite the inner major surface 1174.

FIG. 12 shows eyewear lens 1220 including a first substrate 1270, a second substrate 1271, and one or more optical films 1272 disposed between first substrate 1270 and second substrate 1271. Eyewear lens 1220 includes an inner major surface 1274 and an opposite outer major surface 1276. The one or more optical films 1272 includes a major surface 1275 facing the inner major surface 1274 of the eyewear lens 1220. First substrate 1270 is adjacent one or more optical films 1272 opposite inner major surface 1274 and second substrate 1271 is adjacent one or more optical films 1272 opposite the first substrate 1270.

The one or more optical films 1172 or 1272 may be a diffusely reflective linear polarizer or may be a diffusely reflective circular polarizer which may include one or more films or layers. Light having a first polarization incident on the major surface 1175 or 1275 is diffusely reflected by the diffusely reflective circular polarizer. The one or more optical films may include a quarter-wave layer and a linear polarizer. The linear polarizer may be a reflective linear polarizer, an absorbing linear polarizer, or a combination of a reflective linear polarizer and an absorbing linear polarizer. FIG. 13A shows exemplary one or more optical films 1372 which includes a quarter-wave layer 1381, a reflective linear polarizer 1383 adjacent the quarter-wave layer 1381 and a polarizer 1385 adjacent the reflective linear polarizer 1383 opposite the quarter-wave layer 1381. Reflective linear polarizer 1383 may be a diffusely reflective linear polarizer so that one or more optical films 1372 is a diffusely reflective circular polarizer. One or more optical films 1372 may be disposed in an eyewear lens such that quarter-wave layer 1381 faces an inner major surface of the eyewear lens and polarizer 1385 faces an outer major surface of the eyewear lens. Polarizer 1385 may be an absorbing linear polarizer and may be included so that the eyewear lens appears dark rather than shiny to an observer outside the eyewear lens. Polarizer 1385 may include one or more reflective polarizers and one or more absorbing polarizer. This is illustrated in FIG. 13B which shows polarizer 1385B including an absorbing polarizer 1386 and a reflective polarizer 1387 adjacent the absorbing polarizer 1386. When used in an eyewear lens, reflective polarizer 1387 is adjacent absorbing polarizer 1386 opposite an outer major surface of the eyewear lens. In other words, the absorbing polarizer 1386 faces the outer major surface of the eyewear lens. The reflective polarizer 1387 may be a multilayer birefringent polymeric optical film including alternating birefringent polymeric layers.

In some embodiments, the one or more optical films included in an eyewear lens may not be contiguous but may be separated by a lens substrate as indicated in FIG. 14. FIG. 14 shows a cross-sectional view of eyewear lens 1420 that includes a substrate 1470 a first set of one or more optical films 1472 and a second set of one or more optical films 1473. Eyewear lens 1420 includes inner major surface 1474 configured to face a user when worn and outer major surface 1476 opposite inner major surface 1474. In some embodiments, one or more optical films 1472 includes a diffusely reflective linear polarizer adjacent substrate 1470 opposite outer major surface 1476 and includes a quarter-wave layer adjacent the diffusely reflective linear polarizer opposite substrate 1470. In some embodiments, the one or more optical films 1473 includes an absorbing linear polarizer adjacent substrate 1470 opposite inner major surface 1474. In some embodiments, one or more optical films 1473 further includes a hardcoat layer adjacent the absorbing linear polarizer opposite substrate 1470.

In some embodiments, the eyewear lens includes a reflective polarizer that includes structures which reflect a portion of light incident an off-normal angle into a direction substantially normal to the eyewear lens. The structures may be microstructures and may include Fresnel lenses as illustrated in FIG. 15A or may include a diffraction structure as illustrated in FIG. 16A. In some embodiments, a reflective polarizer is formed (e.g., thermoformed) such that the reflective polarizer is structured. In some embodiments, the reflective polarizer includes two films having a structured interface. In some embodiments, a specular reflective polarizer can be provided with a random texture (for example, by flame embossing) to provide the structures needed to reflect a portion of light incident an off-normal angle into a direction substantially normal to the eyewear lens. The texture may be immersed in the lens (or coated or filled in with an optically clear adhesive used to attach the reflective polarizer to a lens substrate) in order to minimize distortion of the ambient view.

FIG. 15A shows a cross-sectional view of one or more optical films 1572 that is structured (e.g. microstructured) to include Fresnel mirrors 1578, which may be two-dimensional Fresnel structures (e.g., circular Fresnel mirrors) or may be linear elements extending in a direction. One or more optical films 1572 may include a reflective polarizer which may be a multilayer optical film. The reflective polarizer may be a specular reflective polarizer or a diffusely reflective polarizer. The reflective polarizer may be a notch reflective polarizer. The Fresnel mirrors 1578 may be made by thermoforming the reflective polarizer. The reflective polarizer reflects light having a first polarization and transmits light having a second polarization. Light having the first polarization and incident on the reflective polarizer is reflected in a non-specular direction determined by the Fresnel mirrors 1578. Light having the second polarization and incident on the reflective polarizer is transmitted though the reflective polarizer without being significantly influenced by the Fresnel mirrors 1578.

One or more optical films 1572 may be included in an eyewear lens having an inner surface and an outer surface. The eyewear lens may include a first substrate adjacent the one or more optical films 1572 opposite the inner surface and may include a second substrate adjacent the one or more optical films 1572 opposite the first substrate. The first and second substrates may be attached to the one or more optical films 1572 using an optically clear adhesive. The optically clear adhesive may fill in the structure provided by the Fresnel mirrors and this can reduce distortion of the ambient view.

In some embodiments, the one or more optical films 1572 includes a reflective circular polarizer which may include a quarter-wave layer and a linear polarizer adjacent the quarter-wave layer opposite the inner surface of an eyewear lens. In some embodiments, the one or more optical films 1572 includes a structured linear reflective polarizer that includes Fresnel mirrors 1578, an absorbing polarizer adjacent the linear reflective polarizer opposite the inner surface of an eyewear lens, and a quarter-wave layer adjacent the absorbing polarizer opposite the reflective polarizer. The quarter-wave layer and/or the absorbing polarizer layer may be thermoformed along with the linear reflective polarizer, so that all layers are structured (for example, one or more optical films 1372 may be thermoformed (or otherwise formed) to produce one or more optical films 1572). Alternatively, the linear reflective polarizer may be structured, while one or both of the quarter-wave layer and the absorbing polarizer are unstructured layers disposed adjacent the linear reflective polarizer.

FIG. 15B shows light beam 1534 incident on the structured surface of one or more optical films 1572 at an off-normal angle θ. The off-normal angle θ may be in a range of about 10 degrees, or about 20 degrees, to about 70 degrees or about 80 degrees. At least a portion of light beam 1534 is reflected into a direction substantially normal to the eyewear lens. The normal direction 1590 is indicated in FIG. 15B.

In some embodiments, an immersed microstructure, which may be linear prisms having an axis or a direction along which the prisms extend or may be Fresnel lenses, is provided on a substrate with a planarizing material filling in and planarizing the microstructure. If Fresnel lenses are used as the microstructures, the Fresnel lenses may be two-dimensional Fresnel structures (e.g., circular Fresnel lenses) or may be linear elements extending along an axis. In some embodiments, the microstructure (e.g., linear prisms) may be metal coated to form a scattering wire-grid polarizer as described elsewhere. This may increase the scattering efficiency of the lens. The shape of the microstructure can be optimized to scatter light from an incident angle provided by an illuminator towards the eye of a person wearing glasses having a lens containing the microstructure. The substrate may be birefringent and the planarizing material may be index-matched along the axis of the microstructure. In some embodiments, light having a first polarization (e.g., light from an illuminator) is scattered by the microstructure while light having a second polarization, which may be orthogonal to the first polarization, (e.g., ambient light) would pass through without scattering from the microstructure.

FIGS. 16A-16B show a cross-sectional and front view, respectively, of one or more optical films 1672 that includes first optional optical film 1681, which may be a quarter-wave layer, microstructured layer 1677 having microstructures 1678, which may include diffraction features, planarizing layer 1686, and second optional optical film 1685, which may be an absorbing polarizer. One or more optical films 1672 may be included in an eyewear lens with planarizing layer 1686 facing an inner surface of the eyewear lens. The eyewear lens may include a first substrate adjacent the one or more optical films 1672 opposite an inner surface of the eyewear lens and may include a second substrate adjacent one or more optical films 1672 opposite the first substrate. The first and second substrates may be attached to the one or more optical films 1672 using an optically clear adhesive.

Microstructured layer 1677 may be a birefringent layer and planarizing layer 1686 may be index-matched in direction 1679 along which microstructures 1678 extend. Microstructured layer 1677 may be formed by extruding and stretching a polyester layer, for example. Alternatively, microstructured layer 1677 may be made by machining a birefringent polymer layer. Planarizing layer 1686 can be formed by coating the microstructure layer with a radiation curable resin and then curing the resin. Planarizing layer 1686 and microstructured layer 1677 form a reflective polarizer 1683. Light incident on reflective polarizer 1683 and having a polarization such that the electric field is not along direction 1679 will be scattered and at least partially reflected by reflective polarizer 1683. Light incident on reflective polarizer 1683 and having a polarization such that the electric field is substantially along direction 1679 will pass through reflective polarizer 1683 substantially without being scattered.

In FIGS. 16A-16B, microstructured layer 1677 is schematically illustrated as having a single pitch between microstructures 1678, but it should be understood that microstructured layer 1677 may include diffraction features having more than one pitch. In some embodiments, microstructured layer 1677 includes diffraction features or microstructures 1678 having three distinct pitches, one for each of a red, green and blue light produced by an illuminator. The diffraction features with multiple pitches may be in a single layer or multiple layers each having a single pitch may be stacked together to provide scattering in multiple distinct bands.

Figure 16C:
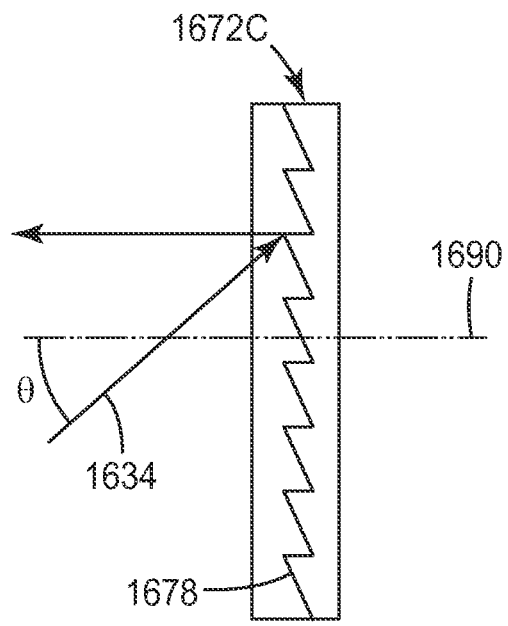
FIG. 16C a schematic side view of light reflecting from an optical film.

FIG. 16C shows light beam 1634 incident on the microstructured surface of one or more optical films 1672C (corresponding to one or more optical films 1672 without optional optical films 1681 and 1685) at an off-normal angle θ. The off-normal angle θ may be in the range described elsewhere. For example, off-normal angle θ may be in a range of about 10 degrees to about 80 degrees. Light beam 1634 is reflected into a direction substantially normal to an eyewear lens including the one or more optical films 1672C. The normal direction 1690 is indicated in FIG. 16C. The normal direction 1690 is normal to the bulk shape of the one or more optical films 1672 and not necessarily normal to individual microstructures. The microstructures 1678 may be diffraction features selected such that diffraction of light beam 1634 from the microstructures 1678 produces a reflection peak in a direction substantially normal to an eyewear lens incorporating the one or more optical films 1672C.

Figure 18:
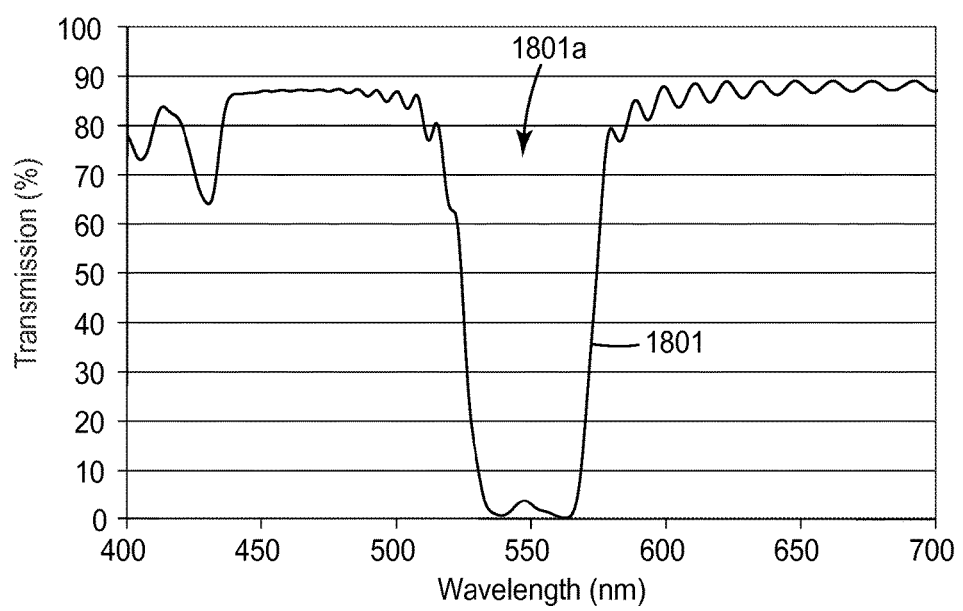
FIG. 18 is a graph of the measured external transmission spectrum of a multilayer optical film having a reflection band that blocks a portion of green visible light.

In some embodiments, an eyewear lens is provided that reflects in narrow wavelength bands corresponding to wavelengths produced by an illuminator. An example of a narrow reflection band is illustrated in FIG. 18. In some embodiments, the eyewear lens includes a film or a coating containing nanoparticles selected to reflect in narrow wavelength bands. Suitable nanoparticles include silver nanoparticles and silica-core silver-shell nanoparticles as described in "Transparent displays enabled by resonant nanoparticle scattering", Hsu et al., Nat. Commun. 5:3152 doi: 10.1038/ncomms4152 (2014). The geometry (diameter and/or shell thickness) can be selected to produce desired reflection bands. The reflection from a film containing such nanoparticles is diffuse so that a portion of light incident on the film at a non-normal angle is scattered into a substantially normal direction. The reflection bands may have a FWHM bandwidth less than about 150 nm, or less than about 120 nm, or less than about 100 nm, or less than about 75 nm. The reflection bands may have a FWHM bandwidth greater than about 20 nm or greater than about 30 nm.

Figure 17:
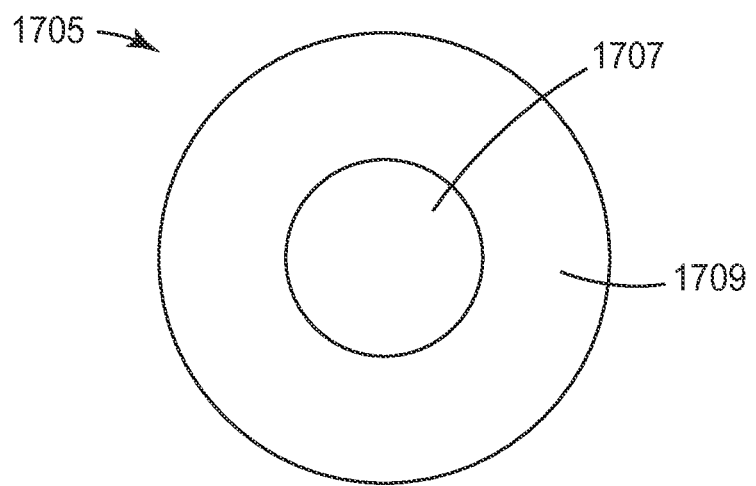
FIG. 17 is a cross-sectional view of a nanoparticle.

A nanoparticle 1705 suitable for use in the nanoparticle containing layer is shown in FIG. 17. Nanoparticle 1705 includes a core 1707, which may be a silica core, and includes shell 1709, which may be a metallic shell such as a silver shell. The radius of the core 1707 may be in a range from about 1 nm to about 40 nm and the shell thickness may be in a range of about 5 nm to about 40 nm. In some embodiments, the nanoparticles include a first plurality of nanoparticles providing reflection in a first reflection band, a second plurality of nanoparticles providing reflection in a second reflection band different from the first reflection band, and a third plurality of nanoparticles providing reflection in a third reflection band different from the first and second reflection bands. In some embodiments, each of the first, second and third reflection bands have a FWHM bandwidth of less than about 150 nm, or less than about 120 nm, or less than about 100 nm, or less than about 75 nm.

The eyewear lenses of the present description may include polarization-selective filters (e.g., the polarizers described elsewhere) and/or may include color-selective filters (e.g, narrow-band scattering layers such as a layer with an appropriate distribution of nanoparticles or a layer or layers having an appropriate diffraction pattern(s) as described elsewhere). In some embodiments, the eyewear lens may include a filter or filters that are both polarization-selective and color-selective (e.g., a notch reflective polarizer as described elsewhere).

Any of the contact lenses or eyewear lenses of the present description may include a photochromic material disposed in at least one layer of the contact lens or eyewear lens. Such a layer can be formed by coating a photochromic compound onto a surface of another layer of the contact or eyewear lens. Alternatively nanoparticles containing photochromic compounds can be incorporated into a film or a coating layer that is included in the contact or eyewear lens. Suitable nanoparticles and coatings are described in U.S. Pat. App. Pub. Nos. 2014/0128608 (Endle et al.) and 2013/0001830 (Endle et al.).

In some embodiments, the display system may include a first illuminator, a first eyewear lens and a first contact lens for a right eye, and a second illuminator, a second eyewear lens and a second contact lens for a left eye. By providing slightly different images to each eye, such a display system may be used to provide a three-dimension (3-D) image to a viewer.

In some embodiments, an eyewear lens includes a plurality of quantum dots disposed in a layer of the lens. Quantum dots can be used to produce diffuse imaged light when illuminated with imaged light from an illuminator. A portion of the diffuse imaged light is incident on a first region of a contact lens and may be focused by the contact lens onto a retina of a person wearing the contact lens. In some embodiments, the illuminator produces blue or ultraviolet light that is down-converted to a wavelength in the visible range by the quantum dots. In some embodiments, the displayed image is monochromatic. In some embodiments, the illuminator produces light in one, two, three, four or more bands and there is a corresponding plurality of quantum dots included in the eyewear lens for each band. In some embodiments, a first plurality of quantum dots providing emission in a first wavelength band is included in a first layer of the eyewear lens and a second plurality of quantum dots providing emission in a second wavelength band different from the first wavelength band is included in the first layer or in a second layer disposed adjacent the first layer. Any number of distinct pluralities of quantum dots providing emission in any number of distinct bands may be incorporated in any number of layers of the eyewear lens. In some embodiments, the quantum dots provide emission in one or more distinct, non-overlapping wavelength bands, each having a bandwidth less than about 60 nm or less than about 50 nm.

The following is a list of exemplary embodiments according to some aspects of the present description.

Item 1. A display system comprising:
 a contact lens having a first region and a second region adjacent the first region;
 an eyewear lens having an inner surface facing the contact lens and having an outer surface opposite the inner surface; and
 an illuminator configured to produce an imaged light output directed toward the inner surface of the eyewear lens,
 wherein the eyewear lens is disposed proximate the contact lens and proximate the illuminator such that a first imaged light ray produced by the illuminator is incident on the inner surface and is reflected by the eyewear lens to the first region, the first region is configured to transmit the first imaged light ray, the second region is configured to reflect or absorb a second imaged light ray produced by the illuminator and reflected from the eyewear lens, the eyewear lens is configured to transmit an ambient light ray incident on the outer surface to the second region, and the second region is configured to transmit the ambient light ray.

Item 2. The display system of item 1, wherein the second region is configured to differentiate ambient light and imaged light based on polarization, spectrum or both.

Item 3. The display system of item 1, wherein the imaged light output is circularly polarized.

Item 4. The display system of item 1, wherein the imaged light output is linearly polarized.

Item 5. The display system of item 1, wherein the eyewear lens includes a polarizer adjacent a substrate of the eyewear lens.

Item 6. The display system of item 5, wherein the polarizer includes a reflective polarizer.

Item 7. The display system of item 6, wherein the polarizer includes an absorbing polarizer adjacent the reflective polarizer with the absorbing polarizer facing the outer surface.

Item 8. The display system of item 6, wherein the reflective polarizer is a notch reflective polarizer.

Item 9. The display system of item 6, wherein the reflective polarizer is a linear reflective polarizer.

Item 10. The display system of item 6, wherein the reflective polarizer is a reflective circular polarizer.

Item 11. The display system of item 10, wherein the reflective circular polarizer includes a linear reflective polarizer adjacent a major surface of the eyewear lens and a quarter-wave layer adjacent the linear reflective polarizer opposite the major surface.

Item 12. The display system of item 11, wherein the linear reflective polarizer is a diffusely reflective polymeric linear polarizer.

Item 13. The display system of item 1, wherein the first region includes an optical element disposed to focus light from the illuminator.

Item 14. The display system of item 13, wherein the contact lens includes a polymeric substrate and the optical element is embedded in the polymeric substrate.

Item 15. The display system of item 1, wherein the first or second region includes a polarizer.

Item 16. The display system of item 15, wherein the polarizer includes a reflective polarizer.

Item 17. The display system of item 16, wherein the polarizer includes an absorbing polarizer adjacent the reflective polarizer with the absorbing polarizer facing the eyewear lens.

Item 18. The display system of item 16, wherein the reflective polarizer is a linear reflective polarizer.

Item 19. The display system of item 18, wherein the polarizer further includes a quarter-wave layer facing the eyewear lens and an absorbing polarizer adjacent the quarter-wave layer opposite the eyewear lens, and wherein the linear reflective polarizer is adjacent the absorbing polarizer opposite the quarter-wave layer.

Item 20. The display system of item 16, wherein the reflective polarizer is a notch reflective polarizer.

Item 21. The display system of item 1, wherein the first or second region includes a multilayer birefringent polymeric optical film.

Item 22. The display system of item 21, wherein the multilayer birefringent polymeric optical film is micro-perforated.

Item 23. The display system of item 1, wherein the first or second region includes a reflective polarizer comprising alternating birefringent polymeric layers and includes an absorbing polarizer adjacent the reflective polarizer and facing the eyewear lens.

Item 24. The display system of item 1, wherein the first region includes a first polarizer which transmits light having a first polarization and the second region includes a second polarizer that reflects or absorbs light having the first polarization, the first polarizer comprising a first multilayer birefringent polymeric optical film and the second polarizer comprising a second multilayer birefringent polymeric optical film.

Item 25. The display system of item 1, wherein the second region is an annular region surrounding the first region.

Item 26. The display system of item 25, wherein the imaged light is circularly polarized, the contact lens includes a contact lens substrate incorporating a first reflective circular polarizer in the annular region, and the eyewear lens includes a second reflective circular polarizer adjacent an eyewear lens substrate.

Item 27. The display system off item 1, wherein about 5 to about 50 percent of the imaged light output produced by the illuminator is transmitted through the contact lens.

Item 28. A contact lens comprising a lens substrate incorporating a micro-perforated first multilayer birefringent polymeric optical film.

Item 29. The contact lens of item 28, wherein the first multilayer birefringent polymeric optical film is a reflective polarizer.

Item 30. The contact lens of item 28, wherein the first multilayer birefringent polymeric optical film includes a notch filter.

Item 31. The contact lens of item 28, wherein the contact lens includes an annular region and a central region, and wherein the first multilayer birefringent polymeric optical film is disposed in the annular region and does not extend into the central region.

Item 32. The contact lens of item 31, wherein the contact lens includes a second multilayer birefringent polymeric optical film in the central region.

Item 33. The contact lens of item 28, wherein the lens substrate incorporates a color-blind corrective optical filter, the color-blind corrective optical filter comprising the micro-perforated first multilayer birefringent polymeric optical film.

Item 34. The contact lens of item 33, wherein the color-blind corrective optical filter includes an absorptive magenta layer disposed on a side of the first multilayer birefringent polymeric optical film, the absorptive magenta layer selectively absorbing green light.

Item 35. The contact lens of item 34, wherein the first multilayer birefringent polymeric optical film has at normal incidence, an average internal transmission from 420-680 nm of at least 50%, and has at normal incidence an average internal transmission of 10% or less over a 10 nm wide wavelength range that includes 550 nm and that is associated with a reflection band having a width (FWHM) of 60 nm or less.

Item 36. The contact lens of item 28, wherein the micro-perforated first multilayer birefringent polymeric optical film has a total perforation open area in a range of about 0.1 percent to about 10 percent of an area of a major surface of the first multilayer birefringent polymeric optical film.

Item 37. The contact lens of item 28, wherein the micro-perforated first multilayer birefringent polymeric optical film includes holes having diameters in a range of about 10 nm to about 150 microns.

Item 38. The contact lens of item 28, wherein the first multilayer birefringent polymeric optical film comprises at least one layer including a photochromic material.

Item 39. The contact lens of item 28, wherein the first multilayer birefringent polymeric optical film is embedded in the lens substrate.

Item 40. A contact lens comprising a lens substrate and having a portion configured to direct a light incident on the portion of the contact lens into a pupil of a user, the portion including a first region and a second region surrounding the first region, wherein the first region incorporates one or more optical elements, the one or more optical elements not extending into the second region, the one or more optical elements comprising glass having a refractive index greater than 1.8.

Item 41. The contact lens of item 40, wherein the one or more optical elements is a monolithic lens.

Item 42. The contact lens of item 40, wherein the one or more optical elements is an array of discrete monolithic lenses.

Item 43. The contact lens of item 40, wherein the one or more optical elements is embedded at least partially within the lens substrate.

Item 44. The contact lens of item 40, wherein the one or more optical elements includes a multilayer birefringent polymeric optical film.

Item 45. The contact lens of item 40, wherein the one or more optical elements includes a reflective polarizer.

Item 46. The contact lens of item 40, wherein the one or more optical elements includes a multilayer birefringent polymeric reflective polarizer and an absorbing polarizer adjacent the multilayer birefringent polymeric reflective polarizer and facing an outer surface of the contact lens.

Item 47. The contact lens of item 40, wherein the second region incorporates a multilayer birefringent polymeric optical film.

Item 48. The contact lens of item 47, wherein the multilayer birefringent polymeric optical film is a reflective polarizer.

Item 49. The contact lens of item 48, wherein the second region incorporates a quarter-wave layer adjacent the reflective polarizer.

Item 50. The contact lens of item 48, wherein the multilayer birefringent polymeric optical film includes a group of alternating birefringent polymeric layers and includes an absorbing polarizer adjacent the group of alternating birefringent polymeric layers.

Item 51. The contact lens of item 40, wherein the second region incorporates a first reflective polarizer that transmits light having a first polarization and reflects light having a second polarization, and the one or more optical elements includes a second reflective polarizer that transmits light having the second polarization and reflects light having the first polarization.

Item 52. A contact lens comprising a first region and a second region adjacent the first region, wherein the first region is not simply connected and either the first region is bounded by the second region or the second region is bounded by the first region, and wherein the second region incorporates at least one optical film spanning the second region, the at least one optical film not extending into the first region.

Item 53. The contact lens of item 52, wherein the first region comprises a plurality of discrete zones surrounded by the second region.

Item 54. The contact lens of item 52, wherein the first region comprises a continuous zone having an outer boundary and at least one disconnected portion of the second region is disposed within the outer boundary.

Item 55. The contact lens of item 52, wherein the at least one optical film includes a multilayer birefringent polymeric optical film.

Item 56. The contact lens of item 52, wherein the first region comprises a first optical film different from the at least one optical film.

Item 57. The contact lens of item 52, wherein the at least one optical film includes a reflective first polarizer configured to transmit light having a first polarization.

Item 58. The contact lens of item 57, wherein the first region includes a second polarizer configured to reflect or absorb light having the first polarization.

Item 59. The contact lens of item 52, wherein the at least one optical film includes a multilayer birefringent polymeric reflective polarizer and the first region is substantially optically clear.

Item 60. The contact lens of item 52, wherein the at least one optical film includes a plurality of layers, at least one layer including a photochromic material.

Item 61. The contact lens of item 52, wherein the at least one optical film includes a micro-perforated multilayer birefringent polymeric optical film.

Item 62. A contact lens comprising a first region and a second region different from the first region, wherein the first region incorporates a first multilayer birefringent polymeric optical film and the second region incorporates a second multilayer birefringent polymeric optical film different from the first multilayer birefringent polymeric optical film.

Item 63. The contact lens of item 62, wherein the first multilayer birefringent polymeric optical film is a first reflective polarizer that reflects light having a first polarization.

Item 64. The contact lens of item 63, wherein the second multilayer birefringent polymeric optical film is a second reflective polarizer that transmits light having the first polarization.

Item 65. The contact lens of item 63, wherein the first polarization is a circular polarization.

Item 66. The contact lens of item 63, wherein the first polarization is a linear polarization.

Item 67. The contact lens of item 62, wherein the second region is an annular shaped region surrounding the first region.

Item 68. The contact lens of item 62, wherein at least one of the first and second multilayer birefringent polymeric optical films are micro-perforated.

Item 69. A contact lens comprising a first region and a second region and incorporating a multilayer optical film having a plurality of layers continuously extending through the first and second regions, wherein in the first region, the plurality of layers provides a first reflective characteristic, and wherein in the second region, the plurality of layers provides a second reflective characteristic different from the first reflective characteristic.

Item 70. The contact lens of item 69, wherein the plurality of layers comprise at least one stack of microlayers arranged into optical repeat units, each optical repeat unit comprising a first microlayer that is birefringent in the second region and less birefringent or isotropic in the first region.

Item 71. The contact lens of item 69, wherein the multilayer optical film transmits light having a first polarization state incident on the second region, reflects light having a second polarization state incident of the second region, and transmits light incident on the first region having the first or the second polarization state.

Item 72. The contact lens of item 69, wherein the second region is an annular region surrounding the first region.

Item 73. The contact lens of item 69, wherein the first region is not simply connected and either the first region is bounded by the second region or the second region is bounded by the first region.

Item 74. The contact lens of item 69, wherein the multilayer optical film is micro-perforated.

Item 75. An eyewear lens comprising a reflective polarizer, wherein the eyewear lens has an inner surface configured to face a user and an outer surface opposite the inner surface, and wherein the reflective polarizer comprises microstructures configured to reflect at least a portion of a light incident on the inner surface of the eyewear lens at an off-normal angle in a range of about 10 degrees to about 80 degrees into a direction substantially normal to the eyewear lens.

Item 76. The eyewear lens of item 75, wherein the microstructures include diffraction features or Fresnel mirrors.

Item 77. The eyewear lens of item 75, wherein the reflective polarizer is a reflective circular polarizer.

Item 78. The eyewear lens of item 77, wherein the reflective circular polarizer comprises a quarter-wave layer and a first linear polarizer adjacent the quarter-wave layer opposite the inner surface.

Item 79. The eyewear lens of item 75, further comprising an absorbing polarizer adjacent the reflective polarizer opposite the inner surface.

Item 80. The eyewear lens of item 75, further comprising a first substrate adjacent the reflective polarizer opposite the inner surface.

Item 81. The eyewear lens of item 80, further comprising a second substrate adjacent the reflective polarizer opposite the first substrate.

Item 82. The eyewear lens of item 75, further comprising a photochromic material disposed in at least one layer of the eyewear lens.

Item 83. An eyewear lens comprising a diffusely reflective circular polarizer, wherein the eyewear lens has an inner major surface configured to face a user and an outer major surface opposite the inner major surface, and the diffusely reflective circular polarizer diffusely reflects light having a first circular polarization incident on the inner major surface.

Item 84. The eyewear lens of item 83, wherein the diffusely reflective circular polarizer includes a linear reflective polarizer and a quarter-wave layer adjacent the linear reflective polarizer opposite the outer major surface.

Item 85. The eyewear lens of item 84, wherein the linear reflective polarizer is a diffusely reflective polymeric linear polarizer.

Item 86. The eyewear lens of item 83, further comprising a first substrate adjacent the diffusely reflective circular polarizer opposite the inner surface.

Item 87. The eyewear lens of item 86, further comprising a second substrate adjacent the diffusely reflective circular polarizer opposite the first substrate.

Item 88. The eyewear lens of item 83, further comprising a linear polarizer adjacent the diffusely reflective circular polarizer opposite the inner major surface.

Item 89. The eyewear lens of item 88, wherein the linear polarizer includes an absorbing polarizer.

Item 90. The eyewear lens of item 89, wherein the linear polarizer includes a reflective polarizer adjacent the absorbing polarizer opposite the outer major surface, the reflective polarizer comprising alternating birefringent polymeric layers.

Item 91. The eyewear lens of item 83, further comprising a photochromic material disposed in at least one layer of the eyewear lens.

Item 92. An eyewear lens comprising a layer incorporating nanoparticles providing wavelength-selective reflection, the wavelength-selective reflection includes a first reflection band having a FWHM bandwidth less than about 150 nm.

Item 93. The eyewear lens of item 92, wherein the nanoparticles are silver or include a silver shell.

Item 94. The eyewear lens of item 92, wherein the nanoparticles include a first plurality of nanoparticles providing reflection in the first reflection band, a second plurality of nanoparticles providing reflection in a second reflection band different from the first reflection band, and a third plurality of nanoparticles providing reflection in a third reflection band different from the first and second reflection bands.

Item 95. A contact lens incorporating a notch reflective polarizer.

Item 96. The contact lens of item 95, wherein the notch reflective polarizer reflects light having a first polarization in a first reflection band having a FWHM bandwidth no greater than about 60 nm.

Item 97. The contact lens of item 96, wherein the notch reflective polarizer reflects light having the first polarization in a second reflection band having a FWHM bandwidth no greater than about 60 nm, the second reflection band not overlapping with the first reflection band.

Item 98. The contact lens of item 97, wherein the notch reflective polarizer reflects light having the first polarization in a third reflection band having a FWHM bandwidth no greater than about 60 nm, the third reflection band not overlapping with the first or second reflection bands.

Item 99. The contact lens of item 95, wherein the notch reflective polarizer comprises a multilayer birefringent polymeric film.

Item 100. The contact lens of item 95, wherein the contact lens comprises a substrate having a first region and a second region adjacent the first region, and wherein the substrate incorporates the notch reflective polarizer in the second region, the notch reflective polarizer not extending into the first region.

Item 101. An eyewear lens incorporating a notch reflective polarizer.

Item 102. The eyewear lens of item 101, wherein the notch reflective polarizer reflects light having a first polarization in a first reflection band having a FWHM bandwidth no greater than about 60 nm.

Item 103. The eyewear lens of item 102, wherein the notch reflective polarizer reflects light having the first polarization in a second reflection band having a FWHM bandwidth no greater than about 60 nm, the second reflection band not overlapping with the first reflection band.

Item 104. The eyewear lens of item 103, wherein the notch reflective polarizer reflects light having the first polarization in a third reflection band having a FWHM bandwidth no greater than about 60 nm, the third reflection band not overlapping with the first or second reflection bands.

Item 105. The eyewear lens of item 103, wherein the notch reflective polarizer comprises a multilayer birefringent polymeric film.

Item 106. The eyewear lens of item 101, wherein the notch reflective polarizer comprises microstructures.

Item 107. An eyewear lens comprising a layer incorporating a first plurality of quantum dots configured to provide emission in a first wavelength band.

Item 108. The eyewear lens of item 107, wherein the first wavelength band has a bandwidth less than about 50 mn.

Item 109. The eyewear lens of item 107, wherein the layer incorporates a second plurality of quantum dots configured to provide emission in a second wavelength band different from the first wavelength band.

Item 110. The eyewear lens of item 109, wherein the first wavelength band has a first bandwidth less than about 50 nm and the second wavelength band has a second bandwidth less than about 50 nm and the first and second wavelength bands do not overlap.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A display system comprising:
a contact lens having a first region and a second region adjacent the first region;
an eyewear lens having an inner surface facing the contact lens and having an outer surface opposite the inner surface; and
an illuminator configured to produce an imaged light output directed toward the inner surface of the eyewear lens,
wherein the eyewear lens is disposed proximate the contact lens and proximate the illuminator such that a first imaged light ray produced by the illuminator is incident on the inner surface and is reflected by the eyewear lens to the first region, the first region is configured to transmit the first imaged light ray, the second region is configured to reflect or absorb a second imaged light ray produced by the illuminator and reflected from the eyewear lens, the eyewear lens is configured to transmit an ambient light ray incident on the outer surface to the second region, and the second region is configured to transmit the ambient light ray.

2. The display system of claim 1, wherein the first region includes an optical element disposed to focus light from the illuminator.

3. The display system of claim 2, wherein the contact lens includes a polymeric substrate and the optical element is embedded in the polymeric substrate.

4. The display system of claim 1, wherein the contact lens comprises a lens substrate incorporating a micro-perforated first multilayer birefringent polymeric optical film.

5. The display system of claim 4, wherein the second region is an annular region and the first region is a central region, and wherein the first multilayer birefringent polymeric optical film is disposed in the annular region and does not extend into the central region.

6. The display system of claim 5, wherein the contact lens includes a second multilayer birefringent polymeric optical film in the central region.

7. The display system of claim 1, wherein the contact lens comprises a lens substrate and having a portion configured to direct a light incident on the portion of the contact lens into a pupil of a user, the portion including the first region and the second region, the second region surrounding the first region, wherein the first region incorporates one or more optical elements, the one or more optical elements not extending into the second region, the one or more optical elements comprising glass having a refractive index greater than 1.8.

8. The display system of claim 1, wherein the first region is not simply connected and either the first region is bounded by the second region or the second region is bounded by the first region, and wherein the second region incorporates at least one optical film spanning the second region, the at least one optical film not extending into the first region.

9. The display system of claim 8, wherein the first region comprises a plurality of discrete zones surrounded by the second region.

10. The display system of claim 8, wherein the first region comprises a continuous zone having an outer boundary and at least one disconnected portion of the second region is disposed within the outer boundary.

11. The display system of claim 1, wherein the eyewear lens comprises a diffusely reflective circular polarizer, wherein the eyewear lens has an inner major surface configured to face a user and an outer major surface opposite the inner major surface, and the diffusely reflective circular polarizer diffusely reflects light having a first circular polarization incident on the inner major surface.

12. The display system of claim 1, wherein the eyewear lens comprises a layer incorporating nanoparticles providing wavelength-selective reflection, the wavelength-selective reflection including a first reflection band having a FWHM bandwidth less than about 150 nm.

13. The display system of claim 1, wherein at least one of the contact lens and the eyewear lens incorporates a notch reflective polarizer.

14. The display system of claim 13, wherein the notch reflective polarizer reflects light having a first polarization in a first reflection band having a FWHM bandwidth no greater than about 60 nm.

15. The display system of claim 14, wherein the notch reflective polarizer reflects light having the first polarization in a second reflection band having a FWHM bandwidth no greater than about 60 nm, the second reflection band not overlapping with the first reflection band.

16. A contact lens comprising a first region and a second region and incorporating a multilayer optical film having a plurality of layers, each layer continuously extending through the first and second regions of the contact lens, the plurality of layers comprising at least one stack of microlayers arranged into a plurality of optical repeat units, each optical repeat unit comprising a first microlayer that is birefringent in the second region and substantially isotropic in the first region such that in the first region, the plurality of layers substantially transmits orthogonal first and second polarization states, and such that in the second region, the plurality of layers substantially transmits the first polarization state and substantially reflects the second polarization state.

17. The contact lens of claim 16, wherein the multilayer optical film is micro-perforated.

18. An eyewear lens comprising a reflective polarizer, wherein the eyewear lens has an inner surface configured to face a user and an outer surface opposite the inner surface, and wherein the reflective polarizer comprises microstructures configured to reflect at least a portion of a light incident on the inner surface of the eyewear lens at an off-normal angle in a range of about 10 degrees to about 80 degrees into a direction substantially normal to the eyewear lens.

19. The eyewear lens of claim 18, wherein the microstructures include diffraction features or Fresnel mirrors.

* * * * *